US007813819B2

(12) United States Patent
Yamada et al.

(10) Patent No.: US 7,813,819 B2
(45) Date of Patent: Oct. 12, 2010

(54) CONTROL SYSTEM FOR CONTROL SUBJECT HAVING COMBUSTION UNIT AND CONTROL SYSTEM FOR PLANT HAVING BOILER

(75) Inventors: Akihiro Yamada, Toukai-mura (JP); Masaki Kanada, Mito (JP); Takaaki Sekiai, Hitachi (JP); Yoshiharu Hayashi, Hitachinaka (JP); Naohiro Kusumi, Hitachinaka (JP); Masayuki Fukai, Hitachi (JP); Satoru Shimizu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/652,172

(22) Filed: Jan. 5, 2010

(65) Prior Publication Data

US 2010/0114457 A1 May 6, 2010

Related U.S. Application Data

(63) Continuation of application No. 11/627,603, filed on Jan. 26, 2007, now Pat. No. 7,660,639.

(30) Foreign Application Priority Data

| Mar. 27, 2006 | (JP) | ............................ 2006-086131 |
| Mar. 31, 2006 | (JP) | ............................ 2006-098519 |

(51) Int. Cl.
*G05B 13/02* (2006.01)
*G06F 7/60* (2006.01)
*G06F 17/10* (2006.01)
*G05B 13/00* (2006.01)

(52) U.S. Cl. ............................ 700/29; 700/28; 700/30; 700/31; 700/47; 702/127; 702/182; 702/183; 703/2; 318/561

(58) Field of Classification Search ............. 700/28–31, 700/47; 318/561; 703/2; 702/127, 182–183
See application file for complete search history.

(56) References Cited

U.S. PATENT DOCUMENTS 5,166,873 A 11/1992 Takatsu et al.

(Continued)

FOREIGN PATENT DOCUMENTS

CN 1051629 5/1991

(Continued)

OTHER PUBLICATIONS

TD, Temporal Difference Learning, 6.1, pp. 142-172.

(Continued)

*Primary Examiner*—Ramesh B Patel
(74) *Attorney, Agent, or Firm*—Brundidge & Stanger, P.C.

(57) ABSTRACT

A control system includes a basic control command operating unit, a fuel data storage unit, a running results database for storing past running results values of a control subject, a data creating unit configured to calculate a distance between data of the past running results values and the data sets and determining data set in which a distance between data becomes minimum, a modeling unit configured to model a relationship between operation parameters of a combustion apparatus and components in combustion gas of the combustion apparatus by using the data set determined by the data creating unit and a correcting unit for calculating combustion apparatus operation parameters with which components having a better condition than that of the components in a current gas are provided by using a model of the modeling unit and correcting operation command values of the basic control command operating unit by calculated operation parameters.

3 Claims, 19 Drawing Sheets

U.S. PATENT DOCUMENTS

| | | | |
|---|---|---|---|
| 5,544,039 A * | 8/1996 | Hiroi | 700/31 |
| 5,930,136 A * | 7/1999 | Nakajima et al. | 700/48 |
| 6,128,586 A * | 10/2000 | Pfeiffer | 702/127 |
| 6,481,201 B2 * | 11/2002 | Kako et al. | 60/285 |
| 6,644,021 B2 * | 11/2003 | Okada et al. | 60/286 |
| 6,654,649 B2 * | 11/2003 | Treiber et al. | 700/31 |
| 6,917,838 B2 * | 7/2005 | Kruger et al. | 700/28 |
| 7,233,886 B2 * | 6/2007 | Wegerich et al. | 703/2 |
| 2002/0100460 A1 * | 8/2002 | Romzek et al. | 123/568.12 |
| 2003/0101724 A1 * | 6/2003 | Zurawski et al. | 60/605.2 |
| 2006/0025961 A1 | 2/2006 | Appel et al. | |
| 2006/0200325 A1 * | 9/2006 | Hayashi | 703/2 |
| 2007/0012040 A1 * | 1/2007 | Nitzke et al. | 60/605.2 |

FOREIGN PATENT DOCUMENTS

| | | |
|---|---|---|
| JP | 8200604 | 8/1996 |
| JP | 2003281462 | 10/2003 |
| JP | 2004169341 | 6/2004 |
| JP | 2004190913 | 7/2004 |
| JP | 2006500694 | 1/2006 |

OTHER PUBLICATIONS

ISBN4-627-82661-3, 1998, pp. 247-254.

* cited by examiner

To Funnel
After Exhaust
Gas Treatment

FIG. 15

| Time | Air Flow Rate (m³) | CO Concentration (ppm) | NOx Concentration (ppm) |
|---|---|---|---|
| 0:00 | 0.3 | 1200 | 80 |
| 0:01 | 0.4 | 600 | 81 |
| 0:02 | 0.5 | 100 | 83 |
| 0:03 | 0.6 | 100 | 84 |
| 0:04 | 0.7 | 400 | 83 |

FIG. 16

| Air Flow Rate (m³) | Air Flow Rate Operation Amount (m³) |
|---|---|
| 0.3～0.39 | +0.1 |
| 0.4～0.49 | +0.05 |
| 0.5～0.59 | +0.0 |
| 0.6～0.69 | -0.05 |

CONTROL SYSTEM FOR CONTROL SUBJECT HAVING COMBUSTION UNIT AND CONTROL SYSTEM FOR PLANT HAVING BOILER

CROSS REFERENCES TO RELATED APPLICATIONS

The present application is a continuation of application Ser. No. 11/627,603, filed Jan. 26, 2007 now U.S. Pat. No. 7,660,639; which relates to Japanese Patent Application JP 2006-086131, filed Mar. 27, 2006 and Japanese Patent Application JP 2006-098519, filed Mar. 31, 2006 and the entire contents of which being incorporated herein by reference.

BACKGROUND OF THE INVENTION

The present invention relates to a control system for a control subject having a combustion unit.

A control logic based on PID (proportional-integral-derivative) control has long been the mainstream in the field of plant control. A large number of technologies capable of flexibly deal with characteristics of a plant have been proposed using a supervised learning function represented by a neural network.

In order to construct a control system by using a supervised learning function, successful models of teacher data may be prepared, and thus an unsupervised learning method also has been proposed.

A reinforcement learning method is known as an example of the unsupervised learning.

The reinforcement learning implies a framework of a learning control to generate an operation signal to the environment through interactive operations in trial and error with the environment such as a control subject such that desirable measurement signals may be obtained from the environment. Thus, when successful models are not prepared, if a desirable state is defined, the control system can learn desirable actions in response to the environment.

The reinforcement learning involves a learning function to generate an operation signal to the environment based on an evaluation value (called a "reward" in the reinforcement learning) of a scalar amount computed by using measurement signals obtained from the environment, so that expected values of evaluation values obtained between the present state and the future state may become maximum. A Non-Patent Document 1 discloses algorithms such as Actor-Critic, Q-learning and real time Dynamic Programming as a method of incorporating such learning function.

As a framework of reinforcement learning obtained by having developed the above-described method, a framework called "Dyna-architecture" has been introduced into the above-described Non-Patent Document 1. The control system method learns in advance a suitable operation signal to be generated by using a model simulating the control subject as a target and determines an operation signal applied to the control subject by using this learning result. Also, this method has a model adjustment function to decrease an error between the control subject and the model.

A plant control system including a combustion apparatus encounters with problems in which combustion characteristics and heat transfer characteristics of the plant are changed when fuel properties are not constant like coal fuels or when coal types are changed. In order to solve these problems, a technology described in the Patent Document 1 may be given.

The technology implies a method of operating a fuel heating value ratio from a deviation between a real measurement signal and a setting value of a main steam pressure in a coal fired boiler.

In addition, a Patent Document 2 has described a control system involving a first estimation unit for calculating a furnace absorbing heating value estimation value that is estimated based on a fluid measurement data on a temperature, pressure, flow rate, and the like in a furnace of a coal fired boiler; a second estimation unit for calculating a final re-combustion device absorbing heating value estimation value that is estimated based on a temperature, pressure, flow rate, and the like of the final re-combustion device; a unit for calculating a ratio between the furnace absorbing heating value estimation value calculated by the first estimation unit and the final re-combustion device absorbing heating value estimation value calculated by the second estimation unit; and an operation unit for grasping boiler combustion characteristics based on the ratio of the absorbing heating value estimation value that is calculated by this unit and outputting a gas distribution damper setting value and a revolution rate setting value and a boiler input acceleration setting value of a gas recirculating ventilator.

In the field of controlling a plant such as a boiler, a control logic which is based on PID control has been a mainstream. Owing to the supervised learning function represented by the neural network, a large number of technologies which can cope with characteristics of the plant with flexibility have been proposed. Then, in order to construct a control system by using this supervised learning function, successful models serving as supervising data have to be prepared in advance. Therefore, the unsupervised learning method such as reinforcement learning method has been proposed.

The reinforcement learning is a learning control framework to generate an operation signal to the environment through interactive operation in trial and error with the environment such as a control subject such that a measurement signal obtained from the environment may become a desirable measurement signal. Thus, even when successful models are not prepared in advance, if only a desirable state is defined, there is an advantage that the control system can learn desirable actions in response to the environment.

Then, in this reinforcement learning method, the operation signal to the environment signal is generated in such a manner that expected values of evaluation values from the present state to the future state may be maximized based on an evaluation value calculated by using the measurement signal obtained from the environment. As a method of incorporating such learning function, there are known algorithms such as Actor-Critic, Q-learning and real time Dynamic Programming.

As a framework of reinforcement learning which developed the above-mentioned method, there is known a framework called "Dyna-architecture". This method learns in advance a suitable operation signal to be generated by using a model simulating the control subject as a target and determines an operation signal applied to the control subject by using this learning result. At that time, this method has a model adjustment function to decrease an error between the control subject and the model.

On the other hand, as numerical value analysis technologies are advanced, combustion reaction can be reproduced to some extent by calculation so that a model can be constructed by using a simulator simulating the plant (see Patent Document 3, for example).

[Patent Document 1]: Japanese Unexamined Patent Publication No. 2004-190913

[Patent Document 2]: Japanese Unexamined Patent Publication No. Heisei 8-200604

[Patent Document 3]: Japanese Unexamined Patent Publication No. 2003-281462

[Non-Patent Document 1]: "Reinforcement Learning", translated jointly by Sadayoshi Mikami and Masaaki Minagawa, published by MORIKITA Publishing Co., Ltd., Dec. 20, 2000

SUMMARY OF THE INVENTION

The above-described documents are able to estimate and control the change of heating value of fuel by calculating heat balance from the changes of generated output values, temperatures, pressures and the like and they may take influences to heat transfer efficiency into consideration. However, the change of fuel properties influences not only heat transfer efficiency but also combustion gas compositions.

If NOx and CO and the like are increased, there is a possibility that external environment will be affected and a load on an exhaust gas treatment system will be increased. However, the above-described documents fail to describe a method which takes an influence to combustion gas compositions into consideration.

Also, a combustion phenomenon is a complicated compound phenomenon of fuel and fluid of air (gas) and heat transfer and combustion reaction so that to control behaviors of the combustion phenomenon is a difficult problem.

In particular, it has been difficult to introduce a suitable operation method for controlling the change of exhaust gas compositions relative to the change of fuel properties. Even when the aforementioned reinforcement learning theory is used, a learning period of a long time is required to learn an operation method for controlling a wide variety of fuel properties in a trial and error fashion. At the same time, there is a possibility that gas properties will be degraded during the learning period.

The present invention intends to provide a control system capable of properly controlling combustion gas components relative to the change of fuel compositions.

Also, as described above, although the reinforcement learning method is effective for the case in which characteristics of the control subject and control methods are not formulated in advance, plant running control needs a time to accumulate running results obtained when the plant has been run in a trial and error fashion until a model is configured. Accordingly, problems arise, in which quality of products is lowered to increase a loss during such period of time. In addition, although it is considered that a bad influence will be exerted upon the environment by the fluctuations of properties of wastes from the plant when the plant has been run in a trial and error fashion, a method of constructing a model effective for these problems is not taken into consideration.

According to the Patent Document 3, while mesh of calculation should be made smaller in order to increase calculation accuracy, a large-sized apparatus such as a boiler needs a vehemently large calculation amount and the running condition also changes continuously so that a calculation time is increased, thereby making it difficult to construct a model within a practical time period.

As described above, while the reinforcement learning method is the effective method for controlling the plant in which a control method may not be formulated in advance, if data are accumulated by trial running of the plant in order to construct a model that may need a longer time, a desired control efficiency may not be obtained during a trial running period.

A second object of the present invention is to provide plant control method and apparatus based on reinforcement learning method in which a model construction period is short and which has excellent performance.

According to a first aspect of the present invention, there is provided a control system for a control subject including a combustion apparatus. This control system includes a basic control command operating unit for inputting measurement data of the control subject including the combustion apparatus and operating an operation command value to the control subject, a fuel data storage unit for storing operation parameters of the combustion apparatus and data sets of components in gas relative to a plurality of fuel compositions supplied to the combustion apparatus, a running results database for storing past running results values of the control subject, data creating unit for calculating a distance between data of the past running results values of the control subject and the data sets and determining data set in which a distance between data becomes minimum, a modeling unit for modeling a relationship between the operation parameters of the combustion apparatus and components in combustion gas of the combustion apparatus by using the data set determined by the data creating unit and a correcting unit for calculating combustion apparatus operation parameters with which components having a better condition than that of the components in a current gas are provided by using a model of the modeling unit and correcting operation command values of the basic control command operating unit by calculated operation parameters.

According to another aspect of the present invention, there is provided a plant control method including a learning function to learn a relationship between an operation amount and a plant state and a function to calculate an operation command value corresponding to the plant state by the learning function. This plant control method includes the steps of calculating a process value prescribing the plant state by numerical value analysis of fluid in a plurality of operation conditions and a reaction phenomenon, creating consecutive models by approximating process values of respective operation conditions to a change of an operation condition parameter so as to have a continuous relationship, creating the continuous model by using the process value calculated by numerical value analysis and running data of an actual plant again and learning by using the continuous model created again.

The present invention includes the above-described units and can properly control exhaust gas components automatically even when fuel compositions (properties) are changed, it is possible to decrease a amount of generated toxic substances such as NOx and CO in the exhaust gas.

Since the present invention includes the units to attain the above-described second object, the plant can be controlled based on a reinforcement learning method by using results of numerical value analysis from trial running of the plant. Accordingly, it is possible to reduce a time period in which the control system is introduced.

BRIEF DESCRIPTION OF THE DRAWINGS

FIG. 15 is an explanatory diagram showing examples of a running results database and a numerical analysis database in the embodiment according to the present invention;

FIG. 16 is an explanatory diagram showing an example of a learning results database in the embodiment according to the present invention;

DESCRIPTION OF THE PREFERRED EMBODIMENTS

Figure 1:
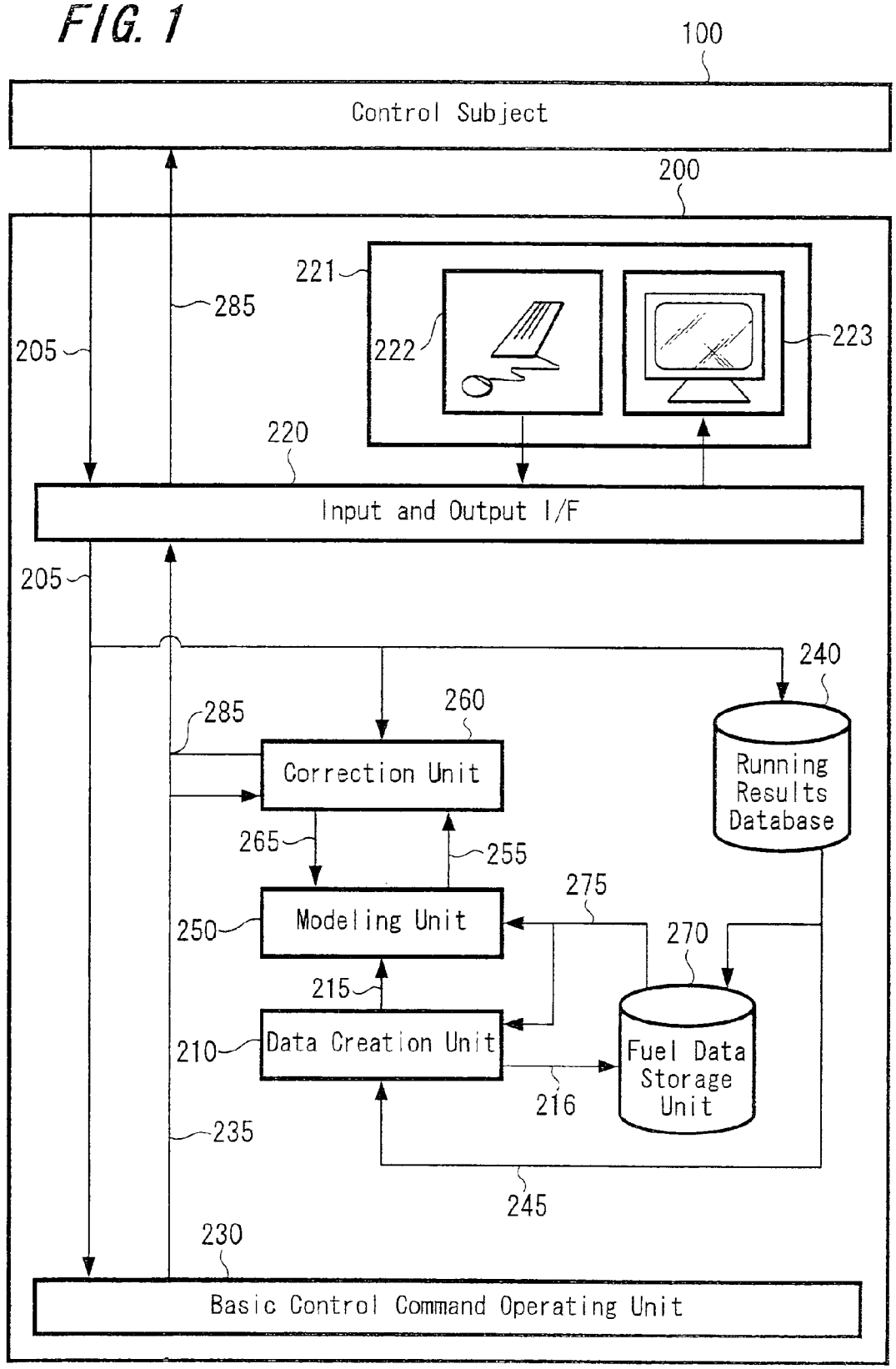
FIG. 1 is a block diagram illustrating a configuration of a control system according to a first embodiment of the present invention.

The embodiments of the present invention will be described below with reference to drawings. FIG. 1 of an accompanying drawing shows a first embodiment of the present invention. As shown in FIG. 1, a control system 200 according to the present invention receives process value measurement information 205 from a plant 100 indicating a control subject, carries out operation pre-programmed within the control system 200.

An operation command signal (control signal) 285 is transmitted to the plant 100 using the resulting measurement information 205. The plant 100 controls a condition of the plant by driving actuators such as gates of valves and gates of dampers in accordance with the received operation command signal 285.

This embodiment is an example in which the present invention is applied to combustion control of a thermal power plant. According to the embodiment of the present invention, in particular, the example in which the present invention is applied to control functions to decrease NOx concentration and CO concentration in an exhaust gas will mainly be described.

Figure 7:
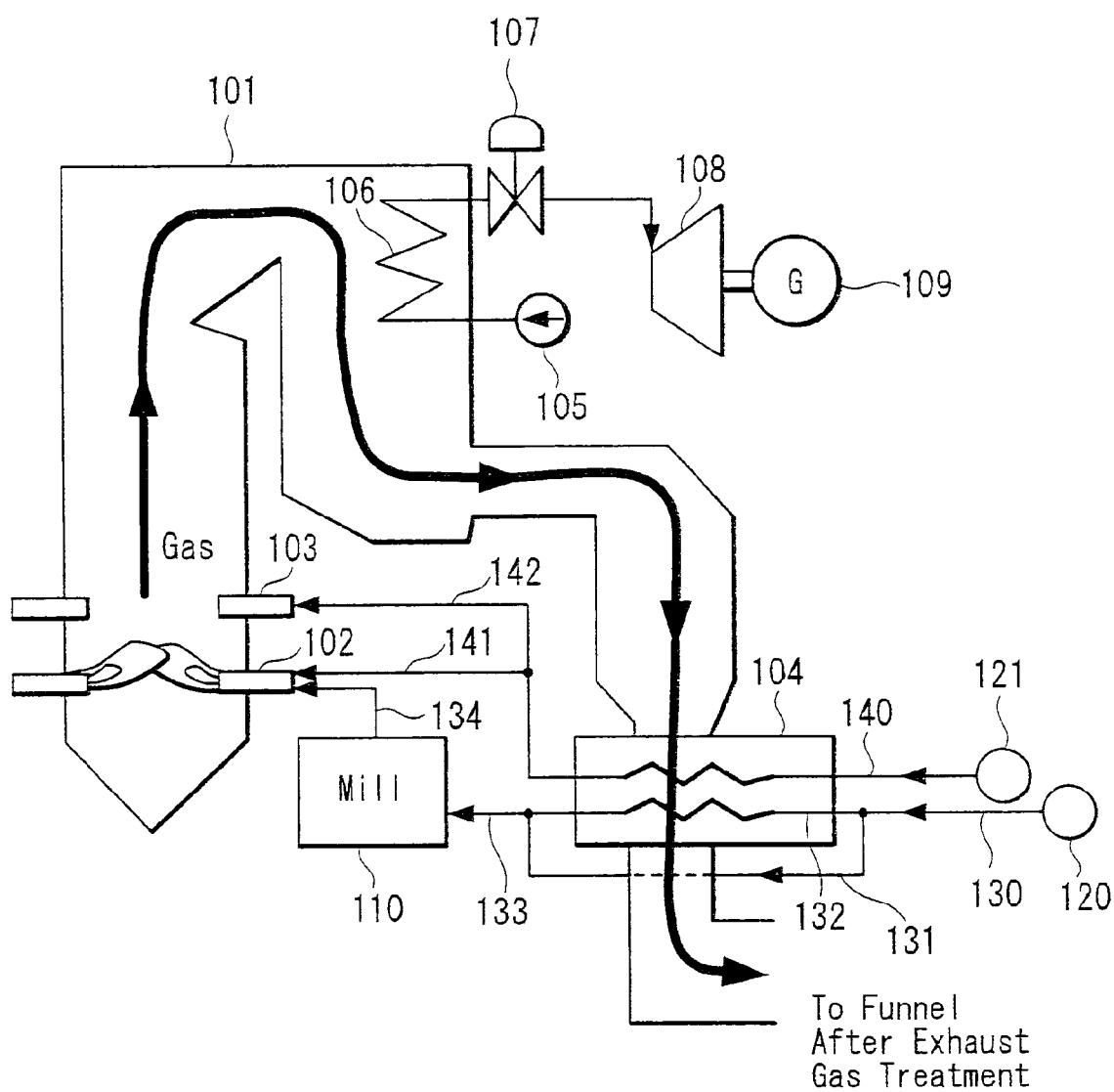
FIG. 7 is a diagram illustrating a configuration of a thermal power plant.

FIG. 7 is a diagram showing a configuration of a thermal power plant indicating the control subject. As shown in FIG. 7, coals available as fuel, primary air used to convey coals and secondary air used to adjust combustion are supplied to a boiler 101 through a burner 102, and coals are burned in the boiler 101. The coals and the primary air are introduced from a pipe 134 into the boiler 101, and the secondary air is introduced from a pipe 141 into the boiler 101. In addition, after-air for a two-staged combustion power generation system is supplied to the boiler 101 through an after-air port 103. The after-air is introduced from a pipe 142 into the boiler 101.

A gas having a high temperature generated from combustion of coals flows through a path of the boiler 101 which is then passes through an air heater 104. Subsequently, a toxic substance is removed from the gas via an exhaust gas treatment system and discharged from a funnel to the air.

Water circulating in the boiler 101 is introduced into the boiler 101 through a water supply pump 105, overheated with a gas in a heat exchanger 106 and thereby changed into steam with high temperature and high pressure. It should be noted that, while there is only one heat exchanger 106 in this embodiment, the present invention is not limited thereto and there may be located a plurality of heat exchangers.

The high temperature and high pressure steam passed through the heat exchanger 106 is introduced through a turbine governor 107 to a steam turbine 108. Energy of the steam drives the steam turbine 108 to enable a generator 109 to generate electricity.

Next, paths of the primary air and the secondary air supplied from the burner 102 and the after-air supplied from the after-air port 103 will be described.

The primary air is introduced from a fan 120 into a pipe 130, diverged in somewhere of its flowing into a pipe 132 passing the air heater and a pipe 131 which does not pass the air heater, merged again in a pipe 133 and introduced into a mill 110. The air passing through the air heater is overheated by a gas. This primary air is used to convey coals (pulverized coals) generated by the mill 110 into the burner 102.

The secondary air and the after-air are introduced from the fan 121 into a pipe 140, overheated by the air heater 104, diverged into a secondary air pipe 141 and an after-air pipe 142 and thereby introduced into the burner 102 and the after-air port 103, respectively.

In order to decrease NOx concentration and the CO concentration, the control system 200 has a function to adjust an amount of air supplied from the burner 102 and an amount of air supplied from the after-air port 103. Although not shown, the thermal power plant includes a gas recirculating facilities to recycle part of combusted exhaust gas into a furnace or to include a system to vary an injection angle of the burner 102 in the upper and lower direction and the control system 200 may intend to control these gas recirculating facilities and injection angle varying system as control subjects. A amount of flowing fuel supplied to the burner 102, an amount of air flowing into the burner 102, a amount of flowing air supplied to the air port, a amount of operations of the gas recirculating facilities, the injection angle of the burner 102 are assumed to be operation parameters to the boiler 101.

The control system 200 includes a basic control command operating unit 230, a correcting unit 260 for varying or correcting a basic control operation command value 235 outputted from the basic control command operating unit 230, a running results database 240 to accumulate and store running results data composed of a process measurement value 250, input signals entered by an operator, command signals from a host control system and the like, an input and output interface 210 to receive and transmit data between it and the control subject plant 100 or the operator and the like and an input and output unit 221 by which the operator can watch various data and the operator can enter setting values, running modes, operation commands for manual running and the like.

The basic control command operating unit 230 includes a PID (proportional-integral-derivative) controller as a basic constituent, receives the operator input signals, command signals from the host control system and the like, operates and outputs the basic operation command value 235 for various kinds of operation units such as valves, dampers and motors installed in the thermal power plant 100.

Functions and configurations of the basic operation command value 235 are identical to those of the control system for the related-art thermal power plant and therefore need not be described.

The present invention is characterized by data creation unit 210, a modeling unit 250, a correction unit 260 and a fuel data storage unit 270 and respective functions thereof will be described hereinafter.

The modeling unit 250 has a function to create models which simulate relationships among fuel flowing amount, air flowing amount available as operation parameters and specific component concentration in the exhaust gas in the operation parameters.

Data 275 is read out from the fuel data storage unit 270 and the control system 200 may learn an input and output relationship by using a back-propagation method in a neural network composed of an input layer, an intermediate layer and an output layer. A configuration and a learning method of the neural network are general methods, and these methods may be other methods. The present invention does not depend on the configuration and learning method of the neural network and their detailed descriptions will be omitted.

Input data may be air flow rates at every position of the burner and the after-air port, a fuel flow rate of every burner and outputs of the generator and output data may be NOx concentration and CO concentration.

While relationships among fuel flow rate, air flow rate, generated output, NOx concentration and CO concentration are modeled in the embodiment of the present invention, the present invention may not limit input items and output items to these elements. Also, the modeling method is not limited to the neural network and the model may be created by using other statistical methods such as a regression model.

The fuel data storage unit 270 includes a plurality of data sets of input data and output data of the modeling unit 250 at every kind of coals (coals have different properties depending on their producing districts).

The data sets are obtained by extracting past results data from the running results database 240 which are calculated results obtained from prior-calculation by carrying out combustion numerical analysis within the boiler.

A model may not be created by only the running results data until running data are accumulated. Therefore, according to the embodiment of the present invention, combustion numerical analysis is carried out by using a calculation system which assimilates design and working conditions of the target plant and analyzed results are stored are stored in the fuel data storage unit 270.

Since a combustion phenomenon is a complicated compound phenomenon such as fluid of fuel and air (gas), heat transfer and combustion reaction, it is generally difficult to grasp its behaviors. However, if combustion basic experiments with variable conditions such as fuel properties (composition and particle size) and combustion atmosphere and element phenomena are modeled based on the thus obtained experimental results, it is possible to analyze a phenomenon such as a boiler of a thermal power plant having large and complex inner behaviors with practical precision.

Also, there have hitherto been technologies of numerical analysis but the vehement number of calculation lattices (meshes) is required to analyze, in particular, a large-sized apparatus such as a boiler with a certain degree of accuracy. Accordingly, it takes plenty of time to industrially calculate the above large-sized apparatus and hence such calculation was impossible in actual practice.

However, by using a numerical analysis technology described in Japanese Unexamined Patent Publication No. 2003-281462, it becomes possible to analyze the phenomenon of the large-sized plant with high accuracy. Also, as performance of computers is improved increasingly in recent years, it becomes possible to realize numerical analysis of detailed phenomenon of the large-sized plant.

A plurality of coal compositions are calculated by the combustion numerical analysis. With respect to the coal composition, compositions of typical coal brands (kinds) are analyzed and determined. Coals are natural resources and compositions of coals produced from the same producing district are not identical to each other. Therefore, samples of a plurality of cases are analyzed and a mean composition is used.

Also, the thermal power plant stores coals in the outside. Hence, since water content in coal is changed with influences of weather and it is frequently observed that properties of coals of the same kind are not identical to each other.

Accordingly, with respect to the coals of the same kind, water content is changed with a plurality of cases, combustion numerical analyses are executed and results of the combustion numerical analyses are stored. Therefore, degrees in which NOx concentration and CO concentration are influenced by the water content can be evaluated.

Next, the data creation unit 210 will be described with reference to FIG. 4.

Figure 4:
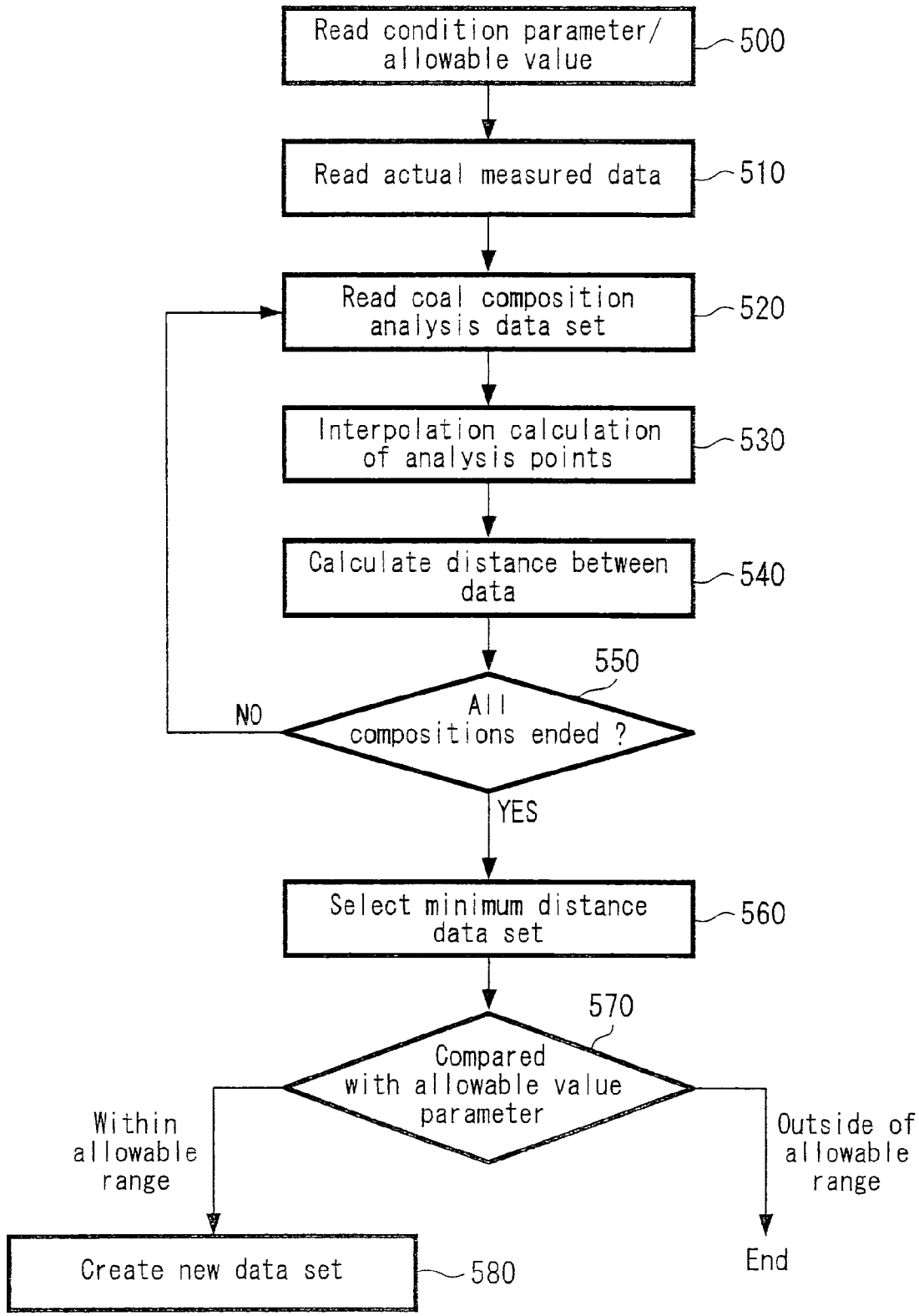
FIG. 4 is a flowchart illustrating a calculation procedure of data creation unit.

Referring to FIG. 4, at a step 500, reference value (distance allowable value between the data) used to judge whether or not data set used in the modeling unit 250 is changed is read out. The reference value can be entered by a keyboard 222, and once it is entered, the entered reference value is memorized. Also, a reference value can be varied later.

At a step 510, a result value 245 of air flow rates at every position of the burner and the after-air port from a predetermined period (for example, one month) to the present state, fuel flow rate of every burner, outputs of the generator, NOx concentration and CO concentration is read out from the running results database 240.

At a step 520, a numerical analysis result data set for use in creating the model now available is read out from the fuel data storage unit 270.

At a step 530, in order that the running results data 245 read at the step 510 may become equal to the values of the air flow rates at every position of the burner and the after-air port and the values of the fuel flow rate at every burner and outputs of the generator, data of the numerical analysis data sets read at the step 520 are interpolated and interpolated values of the NOx concentration and the CO concentration obtained at that time are calculated.

Although a cubic spline interpolation is used as the interpolation method, the present invention is not limited thereto and other interpolation methods may be used in the present invention.

Since the numerical analysis data set is discrete data calculated based on previously-determined conditions, the numerical analysis data sets do not have exactly the same conditions as those of the running results data. Therefore, the above-mentioned data interpolation is carried out so as to make the conditions of the numerical analysis data set become identical to those of the running results data.

At a step 540, data distance between data point of the result value read at the step 510 and the interpolated value of numerical analysis data calculated at the step 530 is calculated.

Data distance is defined by a Euclidean distance shown by the following equation (1). When coordinates of the two data points P and Q are given as (Xp1, Xp2, Xp3, ..., Xpn), (Xq1, Xq2, Xq3, ..., Xqn), square of a distance djk between the two points may be calculated by the following equation (1). Here, Xpi and Xqi available as coordinates represent fuel flow rates of every burner, outputs of generator, NOx concentration and CO concentration. Also, j represents the number of fuel data sets and k represents the number of measured data of NOx and CO in the j-th fuel data set.

$$d_{jk}^2 = \sum_{i=1}^{n} (X_{pi} - X_{qi})^2 \quad (1)$$

At a decision step 550, it is determined whether or not a distance between respective data points of the running results data 245 is calculated with respect to all of the fuel composition data sets stored in the fuel data storage unit 270.

If calculation with respect to all fuel composition data sets is completed as represented by a YES at the decision step 550, control goes to a step 560. If, on the other hand, fuel composition data sets that are not yet calculated remain as represented by a NO at the decision step 550, control goes back to the step 520, at which fuel composition data set available as the calculation target is varied and data distance is calculated by a similar procedure.

At the step 560, first, a mean distance dj-ave between each fuel data set and the running results data 245 is calculated by the following equation (2).

$$d_{j-ave} = \frac{\sum_{m}^{k} = 1^{d_{jm}}}{k} \quad (2)$$

Next, data set in which the mean distance dj-ave is maximized is selected.

At a decision step 570, the reference value (allowable value) read at the step 500 is compared with the mean distance dj-ave. If the mean distance dj-ave is less than the allowable value, information 215 indicating the data set number in which the mean distance dj-ave is minimized is transmitted to the modeling unit 250 and control is ended.

If on the other hand the mean distance dj-ave is greater than the allowable value, control goes to a step 580.

At the step 580, new data set is created and a model correction command signal is outputted to the modeling unit 250. If, on the other hand, the mean distance dj-ave is greater than the allowable value, this means that the existing fuel composition data set is not matched with recent running results data. Accordingly, a new data set is created by adding data set with recent running results data to the fuel composition data set in which the mean distance dj-ave is minimized. In that case, data flag is provided in order to distinguish the numerical value analysis data and the running results data.

The information 215 indicating the newly created data set number and the model correction command signal is supplied to the modeling unit 250.

When receiving the model correcting command information 215, the modeling unit 250 remakes a model by using data of such data set with reference to the new data set number. Although the model making method is the same as that mentioned before, the running results data is distinguished by the data flag and a model is created in such a manner that weight of the running results data is regarded as important data. To be concrete, the running results data can be reflected on the model characteristic stronger than other numerical value analysis data by increasing the number in which running results data is inputted.

As a result, characteristic approximate to running results data can be modeled close to data points in which at least running results are existing and model errors can be decreased.

The data creating unit 210 is executed at an interval of one week, for example. If the mean distance dj-ave exceeds the allowable value, since a model is remade by adding new running results data accumulated during one week to the data set, a ratio of running results data in the data set used to make a model is increased so that the model characteristic approaches actual running characteristics.

Next, the correction unit 260 will be described. The correction unit 260 outputs a simulated operation command signal 265 corresponding to an operation parameter to the modeling unit 250. The modeling unit 250 inputs the simulated operation command signal 265 indicating air flow rates at every position of the burner and the after-air port, fuel flow rate of every burner and output of the generator to the thus made model, calculates NOx concentration and CO concentration, which are the output values of the model and outputs these gas component information 255 to the correction unit 260.

The correction unit 260 reads each operation amount value indicating the current plant state from the running data 205, changes the air flow rates of every position of the burner and the after-air port in a range in which they can be varied until the next operation based on that state and outputs them as the simulated operation command signal 265.

The range of the operation amount is calculated from the actuator operation speeds of the dampers, the valves and the like previously registered and operation (control) intervals. Also, a variable range of each operation amount is divided into operation amounts of the predetermined number and the operation amount is changed with respect to all combinations of the variable ranges.

The modeling unit 250 calculates the NOx concentration and the CO concentration at every simulated operation command signal 265 which is changed as described above. A simulated operation command signal of which evaluation value J that is defined in the following equation (3) is minimized is extracted from these simulated operation command signals. Here, CNOx and CCO represent calculated values of the NOx concentration and the CO concentration and A1, A2 represent coefficients.

$$J = A_1 C_{NOx} + A_2 C_{CO} \quad (3)$$

JR represents an evaluation value calculated by inputting the current measured values of the NOx concentration and the CO concentration into the above equation (3). If the evaluation value J evaluated by the calculated value of the model and the evaluation value JR evaluated by the current measurement value are compared with each other and the condition expressed by the following equation (4) is valid, the basic operation command value 235 is corrected and outputted as an operation command signal 285.

$$J < J_R \qquad (4)$$

If the above equation (4) is valid, the components in the gas indicated by the simulated operation command signal of the model are better conditions than the components in the gas, which are the current measurement value.

Figure 11:
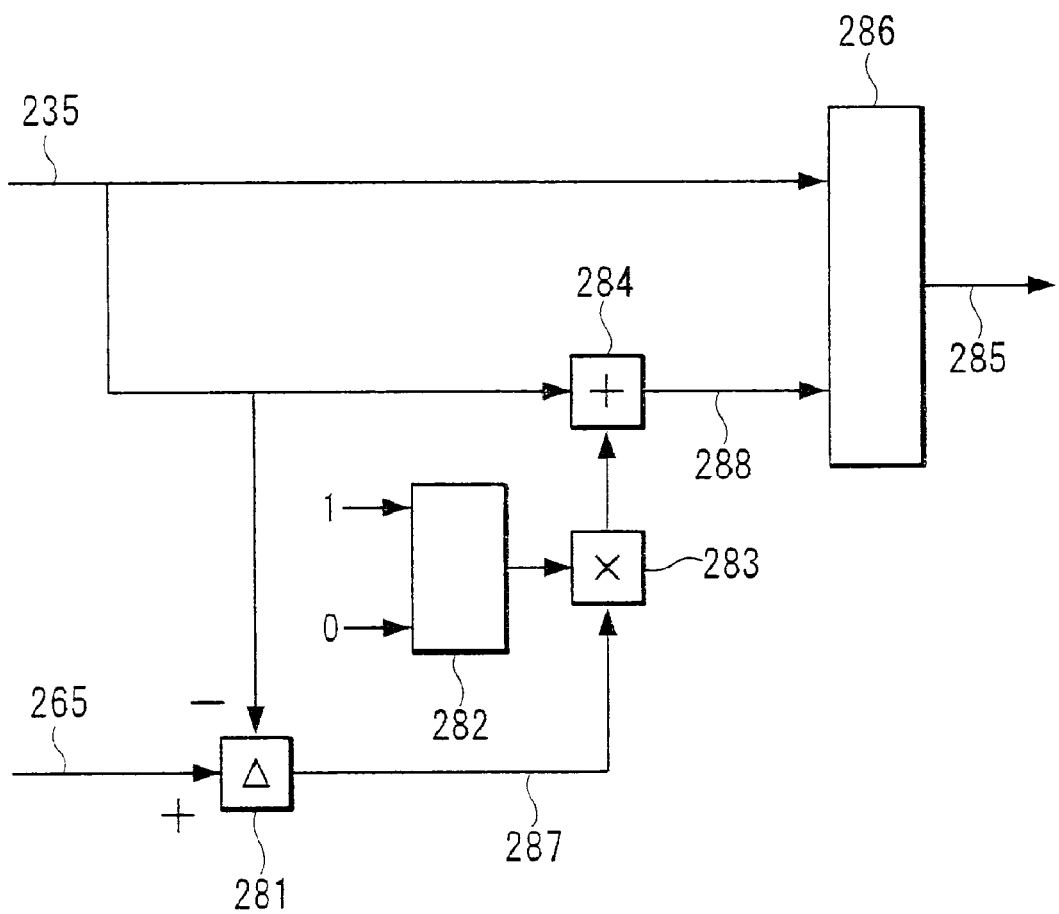
FIG. 11 is a diagram illustrating a correcting circuit.

The correction method will be described with reference to FIG. 11.

A subtracter 281 calculates a deviation signal 287 between the basic operation command value 235 and the simulated operation command signal 265 of which evaluation value J was minimized and an adder 284 adds this deviation signal 287 to the basic operation command value 235 to create a correction operation command value 288.

If a NOx and CO concentration measurement value 255 which is the output value of the modeling unit 250 becomes abnormal due to abnormality of input data or abnormality of an operating circuit, the correction operation command value 288 is made equal to the basic operation command value 235 by decreasing a coefficient multiplied with the deviation signal 287 by a multiplier 283 to zero. Consequently, a risk that an abnormal signal will be outputted inadvertently can be decreased.

It can be determined by checking upper and lower limit values of input data and output data of the modeling unit 250 and by checking upper and lower limits of the range whether or not the NOx and CO concentration value 255 which is the output value of the modeling unit 250 is abnormal. If at least one calculation value is deviated from the previously-set upper and lower limits, it is possible to prevent the simulated operation command signal 265, which was evaluated in the state having a possibility of abnormality, from being outputted by decreasing an output signal of a switcher 282. In other cases, the switcher 282 outputs an output signal of "1".

When receiving a judged result of the equation (4), a switcher 286 selects either the basic operation command value 235 or the correction operation command value 288 and outputs the selected one as the operation command signal 285.

As described above, the operation to decrease the amount of NOx and CO can be decreased when the relationship between the operation amount and the NOx and CO generated amount is evaluated by using the model based on the result of the combustion numerical analysis.

When the fuel properties (coal types) are changed, a proper numerical value analysis data set can be selected so that accuracy of the model can be maintained to be high. Consequently, even when the coal type is changed, it is possible to suppress control performance of NOx and CO from being lowered.

Accordingly, it is possible to automatically carry out an operation in which the operator inputs information of change of fuel properties into the control system and an operation in which control parameters are changed depending on experiences and knowledge of the operator. Therefore, the thermal power plant can be run stably with high performance without depending on technical skills of the operator, and it is possible to decrease a work load imposed on the operator.

Further, if a deviation between the previously-prepared numerical analysis result data set and the running results data is large, a new data set with running results data added is made and a model can be automatically changed to successive models approximate to the running results data.

It should be noted that, while the control target process values in the embodiment of the present invention are the NOx concentration and CO concentration, the present invention is not limited thereto and CO2, Sox, Hg (mercury), fluorine (F), flue gas or fine particles and the like and VOC (volatile organic compound) may be used as control targets.

Figure 2:
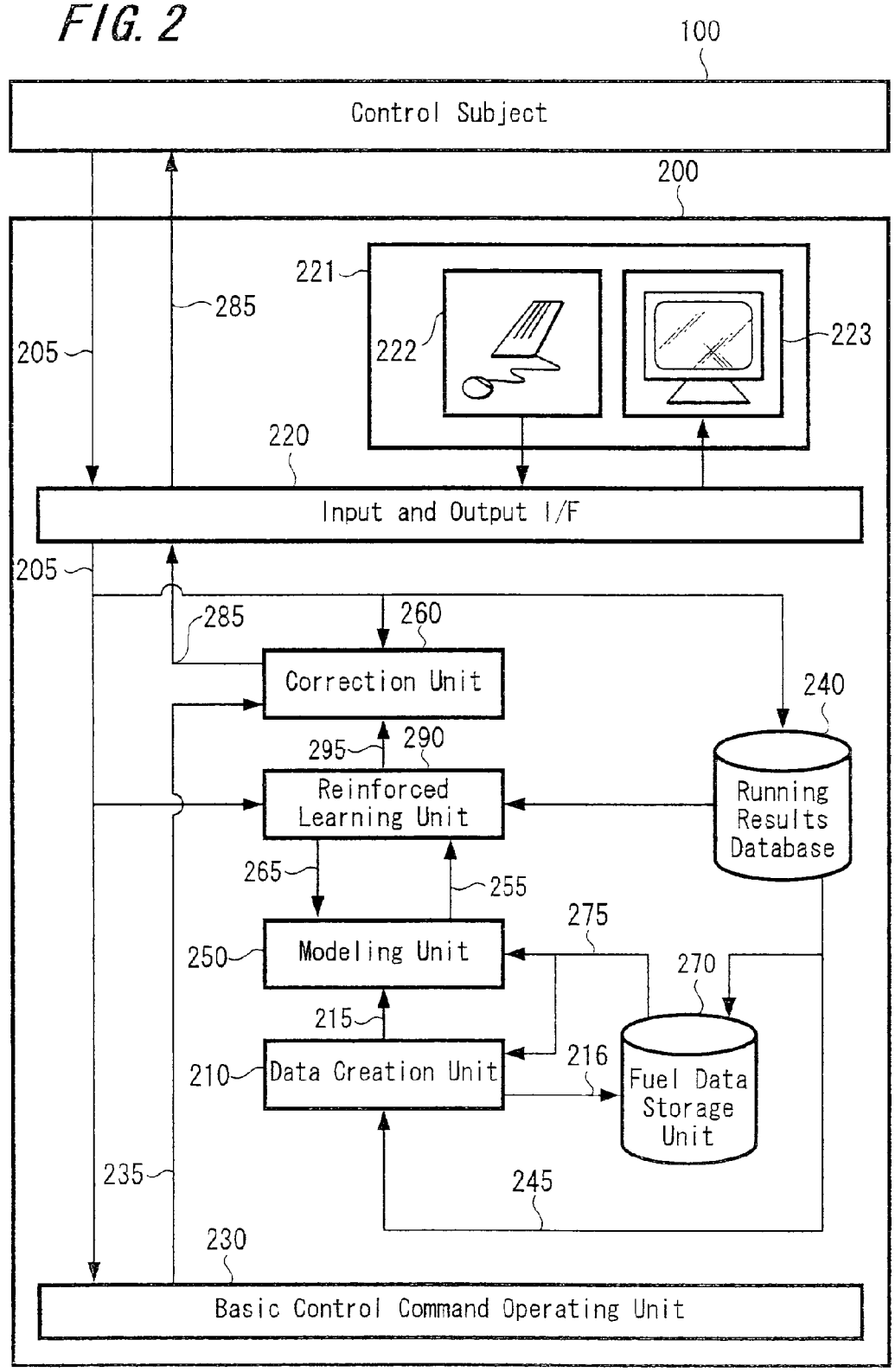
FIG. 2 is a block diagram illustrating a configuration of a control system according to a second embodiment of the present invention.

Next, a second embodiment of the present invention will be described with reference to FIG. 2.

The second embodiment differs from the aforementioned first embodiment in learning an operation method of decreasing NOx and CO by using the reinforcement learning unit 290.

The reinforcement learning unit 290 has a function to learn a proper operation method corresponding to the plant state based on a reinforcement learning theory by using running data accumulated in the running results database 240.

Detailed explanations of the reinforcement learning theory have been described in "Reinforcement Learning" (translated jointly by Sadayoshi Mikami and Masaaki Minagawa, published by Morikita Publishing CO., Ltd., Dec. 20, 2000) and hence only a concept of reinforcement learning will be described.

Figure 9:
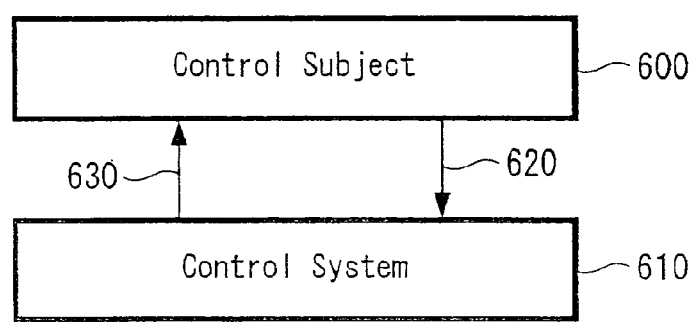
FIG. 9 is a diagram illustrating a concept of reinforced learning.

FIG. 9 shows a control concept based on a reinforcement learning theory. As shown in FIG. 9, a control system 610 outputs an operation command 630 to the control subject 600. The control subject 600 operates in accordance with the control command 630. At that time, the state of the control subject 600 is changed as the control subject 600 is operated in accordance with the control command 630. The control system 610 receives a reward 620 indicating whether a changed state is a desirable state or undesirable state for the control system 610 and which also indicates a degree of the changed state from the control subject 600.

In practice, the information received by the control system 610 from the control subject 600 is the state amount of the control subject and the control system 610 calculates a reward based on the state amount of the control subject. In general, a reward is increased as a changed state approaches a desirable state and a reward is decreased as a changed state approaches an undesirable state.

The control system 610 carries out an operation in a trial and error fashion and learns an operation method by which a reward is maximized (that is, the changed state approaches the desirable state as close as possible), and hence a suitable operation (control) logic can be configured in response to the state of the control subject 600.

A supervised learning theory represented by the neural network has to provide a success example as teacher data in advance, and hence this supervised learning theory is not suitable for a case in which a new plant and a new phenomenon are complex and in which no success example may not be provided beforehand.

On the other hand, since a reinforcement learning theory is classified into one of unsupervised learning and a desirable operation in a trial and error fashion can be provided, the reinforcement learning theory has an advantage such that it can be applied to a case in which characteristics of the control subject are not always apparent.

The second embodiment of the present invention makes effective use of this reinforcement learning theory.

Reinforcement learning may learn in a trial and error fashion. However, when a plant is controlled, it is very difficult to directly operate an actual plant in a trial and error fashion because running will become dangerous and there is a possibility that manufactured products of the plant will be damaged. Therefore, the present invention use a system to create a running characteristic model from the running results of the plant and in which reinforcement learning learns the thus made running characteristic model.

The reinforcement learning unit 290 outputs the simulated operation command signal 265 composed of the air flow rates of every position of the burner and the after-air port and the fuel flow rate of every burner to a model made by the modeling unit 250. The simulated operation command signal 265 corresponds to the plant operation condition and upper and lower limit values, range (unit width) and the maximum range that can be used in one operation are set. In each amount of the simulated operation command 265, respective numerical values are determined randomly within a range of values available.

The modeling unit 250 inputs the simulated operation command signal 265 to the created model and it calculates the NOx and CO concentration which becomes the output data 255.

The reinforcement learning unit 290 receives the output data 255 from the modeling unit 250 and calculates a reward value.

A reward is defined by the following equation (5). Here, R represents a reward value, ONOx represents a NOx value, OCO represents a CO value, SNOx and SCO represent target set values of NOx and CO and k1, k2, k3 and k4 represent positive constants, respectively.

$$R = R_1 + R_2 + R_2 + R_4 \quad (5)$$

$$= R_1 = \begin{cases} k_1(O_{NOx} \le S_{NOx}) \\ O(O_{NOx} > S_{NOx}) \end{cases}$$

$$= R_2 = \begin{cases} k_2(O_{CO} \le S_{CO}) \\ O(O_{CO} > S_{CO}) \end{cases}$$

$$= R_3 = \begin{cases} k_3(S_{NOx} - O_{NOx})(O_{NOx} \le S_{NOx}) \\ O(O_{NOx} > S_{NOx}) \end{cases}$$

$$= R_4 = \begin{cases} k_4(S_{CO} - O_{CO})(O_{CO} \le S_{CO}) \\ O(O_{CO} > S_{CO}) \end{cases}$$

As shown in the above equation (5), when the NOx value and the CO value are lowered more than the target set values, the rewards R1 and R2 are given to the reinforcement learning unit 290. When they are further lowered more than the target set values, a reward is given to the reinforcement learning unit 290 in proportion to a deviation.

It should be noted that various other methods may be considered as the reward defining method and that the reward defining method is not limited to the method expressed by the above equation (5).

Since the reinforcement learning unit 290 learns a combination of the simulated operation command signals 265, that is, the operation amounts such that the reward calculated by the equation (5) may become maximum, it can therefore learn a combination of operation amounts to decrease NOx and CO in response to the present state.

In the state in which learning is finished, the reinforcement learning unit 290 reads running data 205 of the current time and outputs an operation amount 295 to maximize the reward of the above equation (5) based on the learning results.

The correction unit 260 corrects the basic operation command value 235 and outputs the thus corrected basic operation command value as the operation command signal 285.

Figure 13:
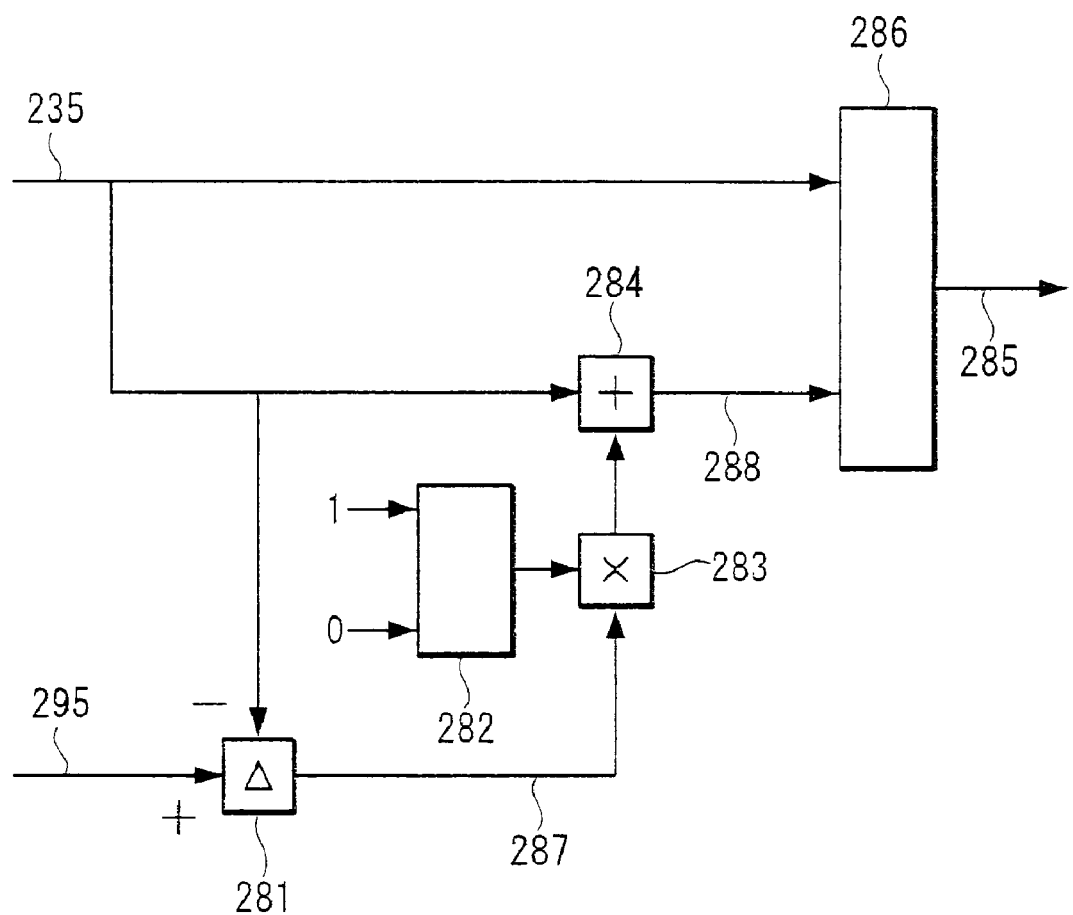
FIG. 13 is a diagram illustrating a correcting circuit.

The correction method is basically identical to that of the first embodiment. FIG. 13 is a diagram showing a correction circuit. As shown in FIG. 13, the correction method of the second embodiment differs from that of the first embodiment shown in FIG. 11 in that the simulated operation command signal 265 is replaced with the operation amount 295 calculated by the reinforcement learning unit 290.

In general, "1" is set to the output of the switcher 282 and a deviation between the basic operation command value 235 and the operation amount 295 is added to the basic operation command value 235 by an adder 284 and thereby outputted as a reinforcement learning command value 288.

The switcher 286 selects the reinforcement learning command value 288 and outputs the same as the operation command value 285.

However, when any one of the input and output values of the modeling unit 250 and the input and output values of the reinforcement learning unit 290 is deviated from the upper and lower limit values and the limiting range of the rate, "0" is selected as the output of the switcher 282 and the switcher 286 selects and outputs the basic operation command value 235.

Consequently, it is possible to doubly prevent an abnormal operation command value from being outputted due to abnormality of data and the operation circuit.

When the control deviation exceeds a predetermined range as the control result of the reinforcement learning command value 288 or when its frequency and its continuing time exceed predetermined ranges, it is judged that the reinforcement learning command value 288 is not effective and the switchers 282 and 286 are caused to carry out similar selection (processing) similar to that obtained when abnormality occurs in data, thereby stopping the output of the reinforcement learning command value 288. Even at that time, the plant can be continued to run based on the basic operation command value 235 and it is possible to protect the running of the plant from troubles.

As described above, in the second embodiment of the present invention, the optimum operation method can be automatically constructed by the reinforcement learning unit 290. In the state in which learning is ended, since the operation amount to maximize the reward is outputted at the instant the current running state data 205 is inputted, it is not necessary to search a combination of suitable operation amounts while combinations of the simulated operation command signals 265 are being changed at every control timing unlike the first embodiment of the present invention, a load imposed upon the computer when the plant is controlled can be decreased. As a consequence, stability of operations of the computer can be increased and reliability of the control system can be improved so that safety and stability of the running of the plant also can be improved.

Figure 3:
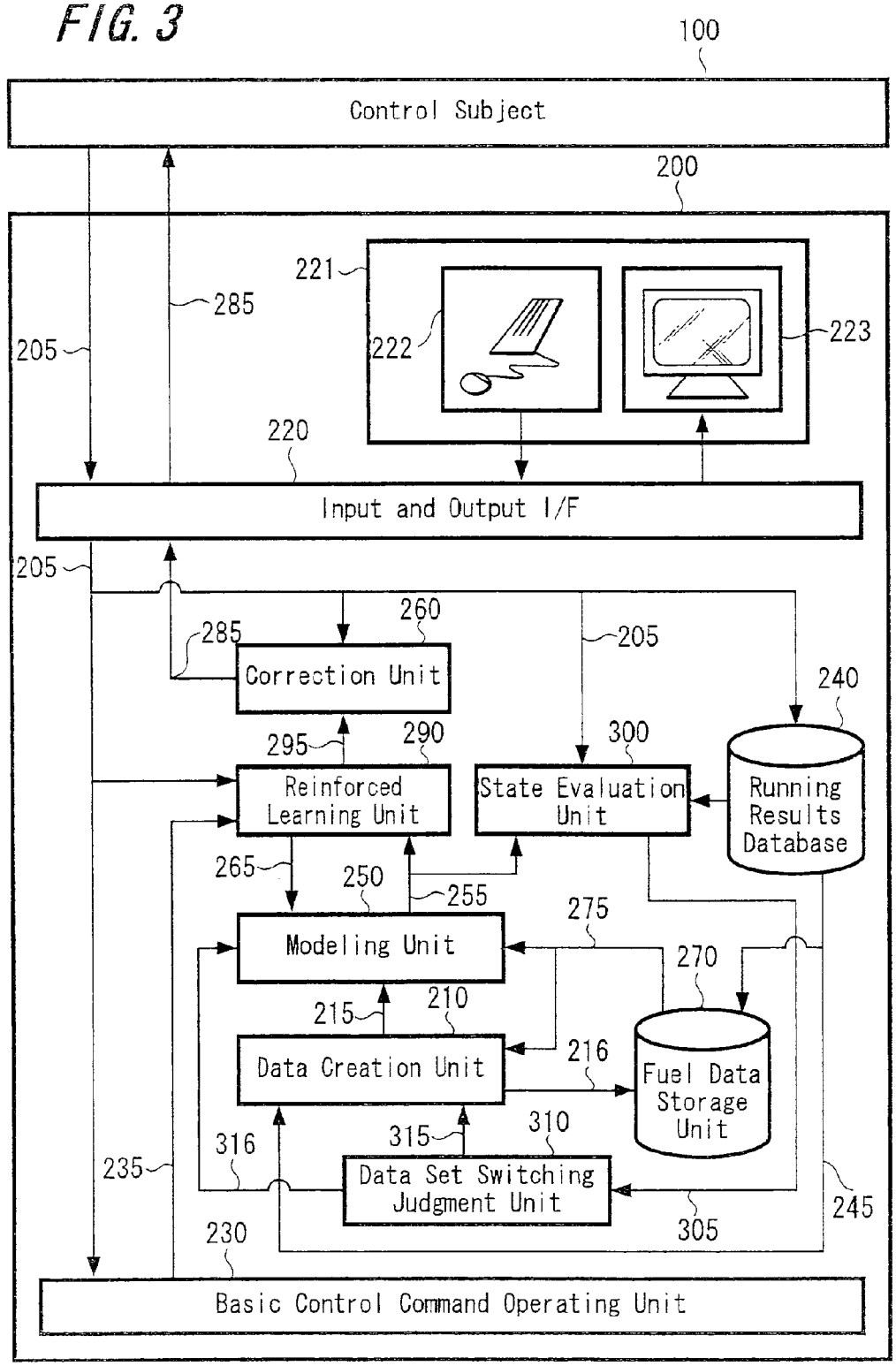
FIG. 3 is a block diagram illustrating a configuration of a control system according to a third embodiment of the present invention.

Next, a third embodiment of the present invention will be described with reference to FIG. 3.

The third embodiment is different from the second embodiment that the third embodiment includes a state evaluation unit 300 and data set switching unit 310. The state evaluation unit 300 monitors model error that is a deviation between the calculated value of the model created by the modeling unit 250 and the corresponding running results data 205.

Processing procedures of the state evaluation unit 300 and the data set switching unit 310 will be described with reference to FIG. 12.

Figure 12:
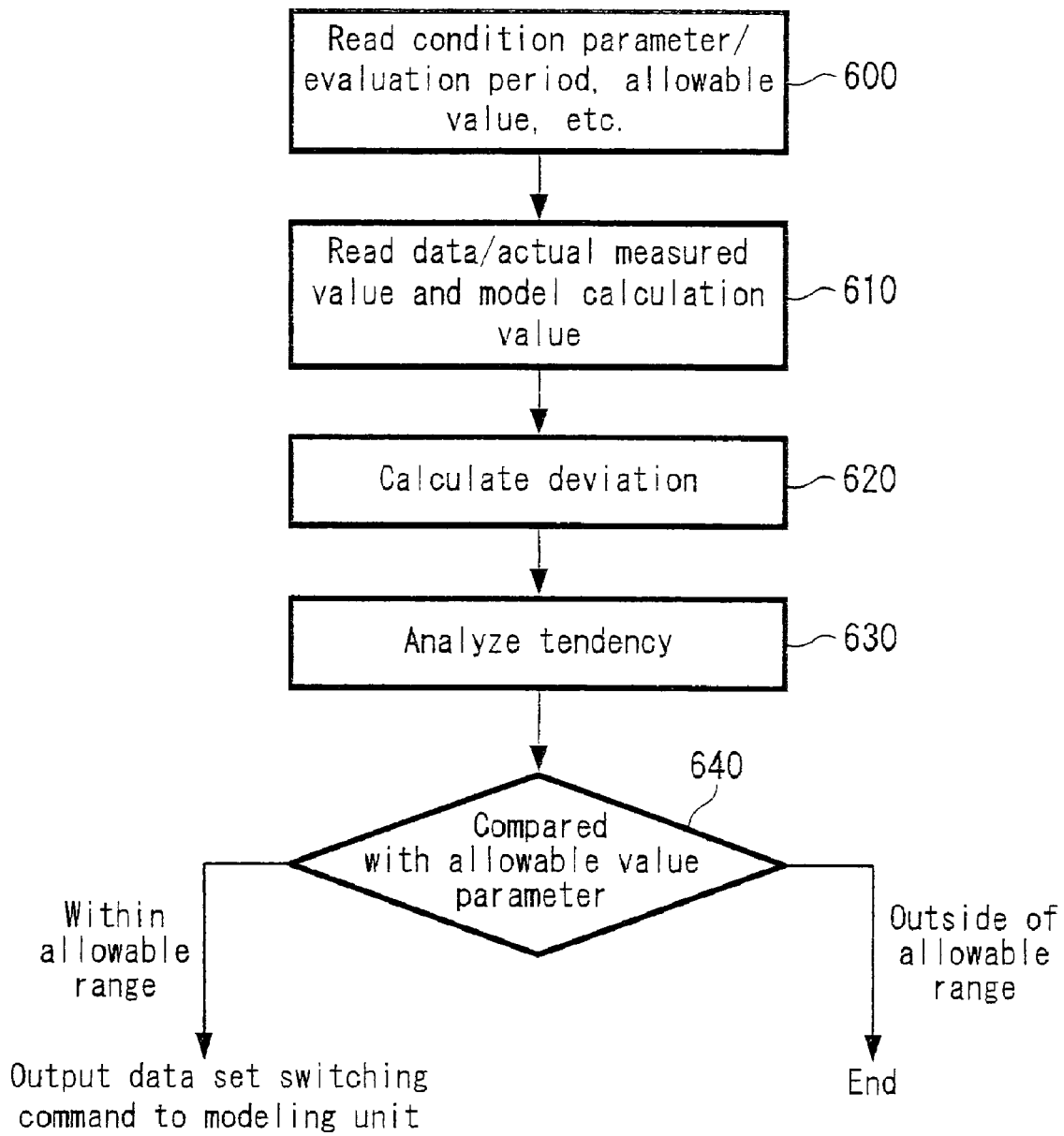
FIG. 12 is a flowchart illustrating procedures of a state evaluation unit 300 and data set switching unit 310.

Referring to FIG. 12, a set value of an allowable value relative to model error is read at a step 600.

At a step 610, the running results data 205 and the calculated value obtained by inputting the model of the operation amount result value are read.

At a step 620, a deviation (model error) between the running results data 205 read at the step 610 and the model calculated value 255 in the corresponding operation condition is calculated.

At a step 630, movement mean values are calculated relative to past time-series data of the model errors calculated at the step 620, movement mean values and rates of the movement mean values at a predetermined time interval are calculated.

At a step 640, the movement mean values of the model errors, the rate values of the movement mean values and the model errors at respective time calculated at the step 630 are compared with corresponding allowable values read at the step 600.

If the above values fall within the allowable range, control is ended. If on the other hand the above values are out of the allowable range, data set switching command 315 is outputted to the data creation unit 210 and a model change command 316 is outputted to the modeling unit 250.

The steps 600 to 630 are executed by the state evaluation unit 300 and the step 640 is executed by the data set switching unit 310.

Figure 5:
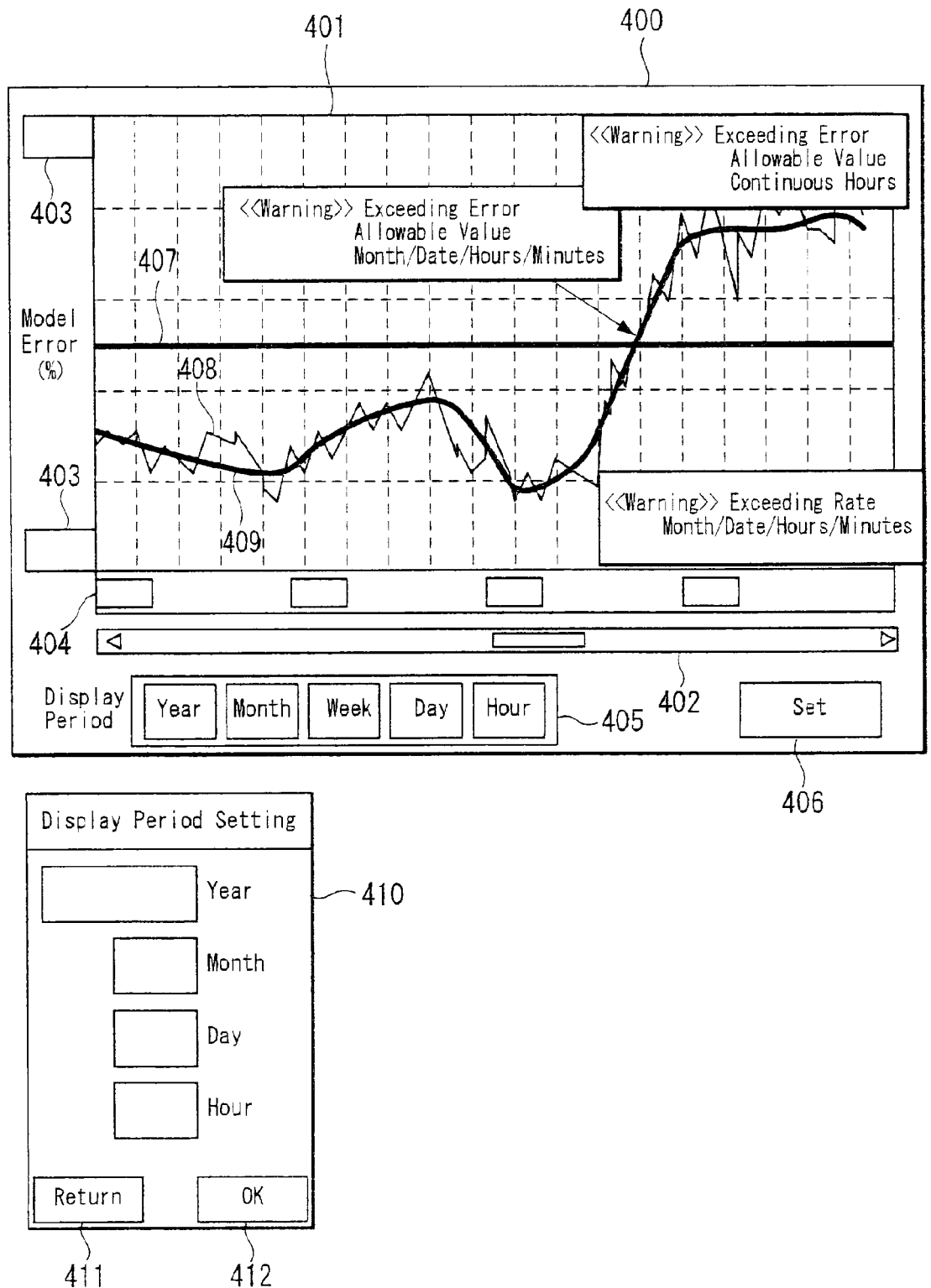
FIG. 5 is a diagram illustrating an example of a displayed picture of a model error.

FIG. 5 shows an example of the picture of operated results of the state evaluation unit 300.

As shown in FIG. 5, in a display screen 400, a time-series graph of model error is displayed within a graph area 401. The graph shows a model error 408 of respective time and corresponding movement mean value 409.

The vertical axis of the graph shows model error (%) and a displayed range value (for example, 0, 100) can be inputted to an input column 403. The horizontal axis of the graph shows a time and data or time can be displayed on a display column 404. On the horizontal axis, an operator can change a displayed time by operating a scroll bar 402 with a mouse.

With respect to a display period, the operator can select a year unit, a month unit, a week unit, a day unit and an hour unit by using a display period selection button 405. When the operator selects any one of the buttons on the display period selection button 405 by using the mouse, a display period input window 410 is displayed and the operator is able to designate a start time of the period to be displayed. When the operator does nothing and presses an "OK" button 412, a display start time is automatically selected in accordance with the selected display period based on the selected current time. Also, when the operator presses a "RETURN" button 411, inputted information is canceled.

Based on this screen, the operator is able to watch changes of model error in a time-series fashion and the operator can easily understand a state in which the available model is laid relative to a model error allowable value 407. When the operator intends to change setting of an allowable value, the operator can move to a setting screen by clicking a "SET" button 406.

If it is determined based on the calculated results of the data set switching unit 310 that the values exceed the allowable range, warning messages are displayed on the screen. Contents of warning messages are "EXCEEDING ALLOWABLE VALUE OF MODEL ERROR", "CONTINUOUS TIME DISPLAY OF EXCEEDING ALLOWABLE VALUE OF MODEL ERROR" and "EXCEEDING ALLOWABLE VALUE OF MODEL ERROR RATE".

When any of the warning messages is generated, the display screen 400 is automatically displayed to urge the operator to pay attention. At the same time, the data set switching unit 310 outputs the data set switching command 315 to the data creation unit 210 and outputs the model change command 316 to the modeling unit 250.

In particular, in the case of the "EXCEEDING ALLOWABLE VALUE OF MODEL ERROR RATE" and the "OVER MODEL ERROR ALLOWABLE VALUE", such changes can be regarded as rapid changes of the plant characteristics. In this case, there is a large possibility that fuel properties were changed. Therefore, the fuel composition data set is changed or a new data set is created by the method described in the first embodiment and a model is reconstructed. Also, reinforcement learning is carried out on the reconstructed model available as the subject and it is possible to follow the change of the state automatically.

As a result, since a tendency of model error can constantly be watched automatically and the model can be changed and reinforcement learning can be carried out again, it is possible to constantly maintain stable control performance.

Figure 6:
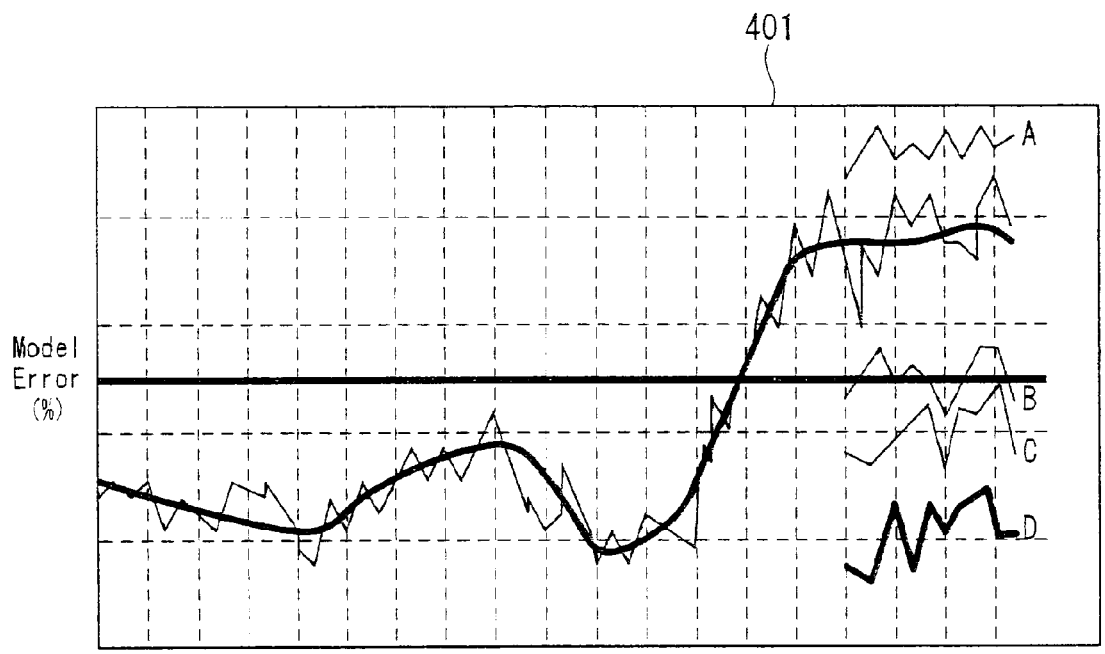
FIG. 6 is a diagram illustrating an example of a displayed picture of a model error.

FIG. 6 is a diagram showing an example of results obtained when the model error was evaluated after the fuel data set has been changed by the data creation unit 210 and the model was has been reconstructed. In FIG. 6, model errors are displayed with respect to fuel compositions A to D. As a standard to select the data set by the data creation unit 210, a mean value of model errors shown in FIG. 6 may be calculated and a fuel composition data set may be selected such that this mean value may be minimized.

Figure 10:
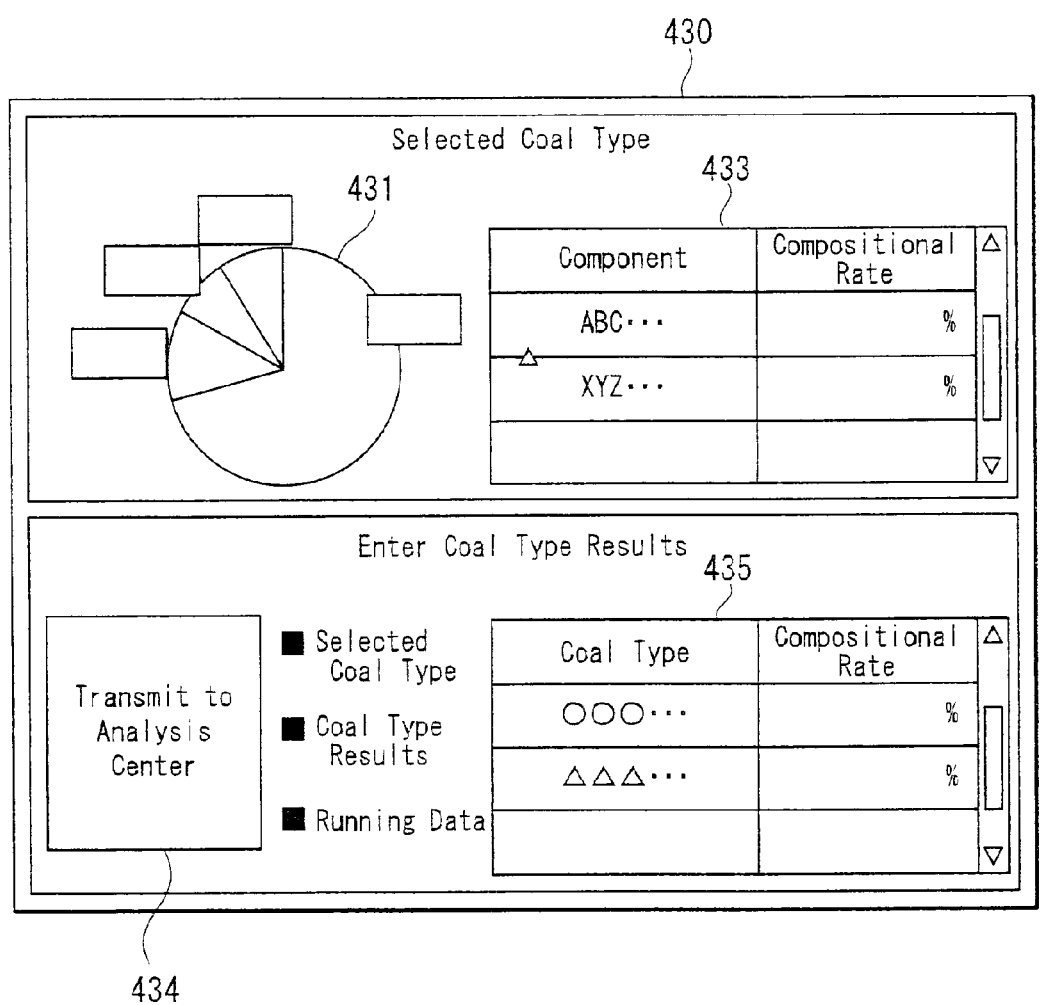
FIG. 10 is a diagram illustrating examples of displayed fuel data sets and input screen of fuel properties and states.

FIG. 10 is a diagram showing a display screen example 430 of a fuel composition data set selected by the data creation unit 210. On the upper stage of the screen, the composition of the selected data set is displayed in the form of a circle graph 431 and a table 433.

On the lower stage of the input screen, the operator can input properties of fuel available in actual practice. If a plurality of coal types is mixed, the operator can input the names of coal types and the mixing ratios thereof into an input column 435.

Figure 8:
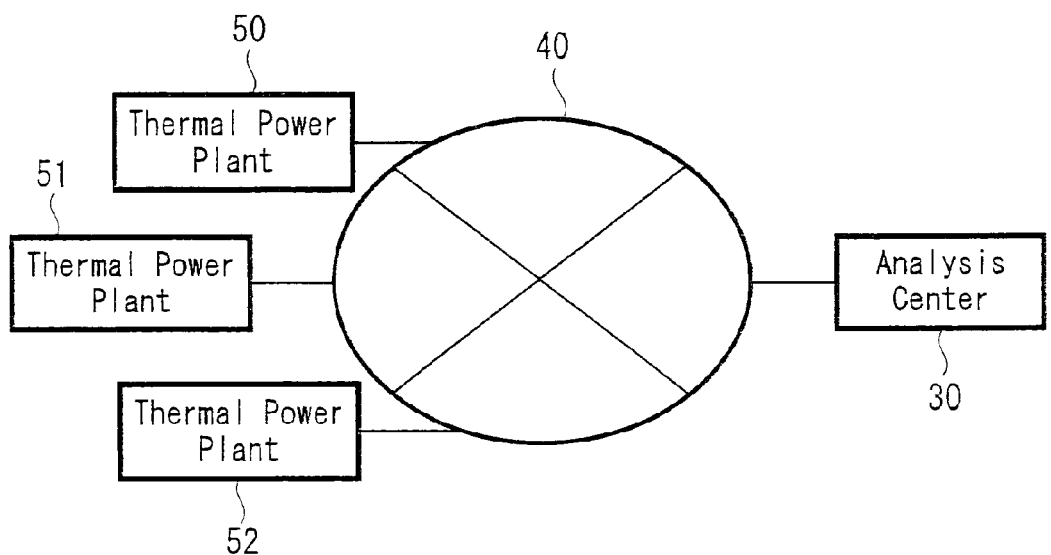
FIG. 8 is a diagram illustrating a communication relationship between a thermal power plant group and an analysis center.

This information can be transmitted to the analysis center 30. As shown in FIG. 8, the analysis center 30 is connected through an exclusively-designed communication network 40 to a plurality of thermal power plants 50, 51 and 52, and hence data can be transmitted and received therebetween.

When the operator presses a "TRANSMISSION TO ANALYSIS CENTER" button 434, information entered into the input column 435 by the operator is transmitted to the analysis center 30. Also, a name of data set selected by the data creation unit 210 and recent running results data (operation command value and process value) are transmitted to the analysis center 30.

When receiving the above-described information from the thermal power plants 50 to 51, the analysis center 30 enters subject plant structure data of combustion numerical analysis and received operation amount result values to an analysis model, calculates NOx concentration and CO concentration while variously changing fuel composition data available as one of calculation conditions and selects fuel composition data such that errors between the received NOx concentration and CO concentration and actually measured values may be minimized.

The thus selected fuel composition data set, the model constructed by this data set and learning results obtained by learning this model in a reinforcement learning fashion are transmitted through the exclusively-designed communication network 40 to a subject thermal power plant.

When confirming this received information, the control system 200 stores a newly received fuel composition data set in the fuel data storage unit 270, sets a received model to the modeling unit 250 and sets a received reinforcement learning result to the reinforcement learning unit 290.

A model constructing method and a reinforcement learning method in the analysis center 30 are similar to those of the methods described in the aforementioned first and second embodiments.

As described above, when detailed information concerning the change of fuel is obtained, since the data set with higher accuracy and the model using such highly-accurate model can be updated, it is possible to maintain highly efficient control performance.

While the numerical value analysis in which the fuel composition data set is changed, the model construction and the reinforcement learning are carried out in the analysis center 30 as data received from the thermal power plant in this embodiment, if many numerical value analyses in which fuel components are variously changed in advance are carried out and results of these numerical value analyses are saved, it is sufficient that data set or model may be selected from the analysis results saved when data indicating changes of fuel properties are received, and hence it is possible to immediately provide a new model to the thermal power plant. Therefore, it is possible to reduce a time in which control performance is lowered by the change of fuel.

Also, before data indicating fuel properties is received from the thermal power plant, various kinds of fuel properties can be analyzed in advance, new fuel composition data sets, models configured by using such new fuel composition data sets and learning results obtained when reinforcement learning is carried out on such models available as subjects can be successively transmitted to the thermal power plant and the thermal power plant can save these information.

In this case, although there is a possibility that a storage capacity on the side of the thermal power plant, a communication load and a communication cost will be increased, since the control system need not communicate with the analysis center 30 when a coal type is changed and also the control system can readily cope with a new model or a new reinforcement learning result, it is possible to reduce a time during which a risk in which control performance is lowered by the change of coal type takes place.

Effects achieved by the above-described embodiment are as follows.

Since the exhaust gas components can be controlled automatically and properly even when the fuel compositions (properties) are changed, it is possible to decrease an amount in which a toxic substance such as NOx and CO in the exhaust gas is generated.

Also, a longer period can be unnecessary for learning and effects of the control system can be exhibited from the beginning. In general, there is a possibility that a trial and error-like driving in the learning will increase an amount of exhausted toxic substances. However, according to the present invention, learning based on the trial and error-like driving can be removed so that the amount of the exhausted toxic substance can be decreased.

Further, since the amount of NOx and the like in the exhaust gas can be decreased, a amount of utility such as a amount of ammonium used in a denitrification system can be decreased and it can also be expected that the denitrification system will be reduced in size and that the life of catalyst will be elongated.

Also, since the control system can automatically follow the change of fuel properties, not only can load of adjustment work on the operator be decreased but also suitable control can be realized without depending on experiences and knowledge of the operator. Thus, there is an advantage that reliability of plant driving can be improved.

While the control system has been so far mainly explained as the control system for controlling a plant having a boiler in the above-described embodiments, the control system according to the present invention can be applied to the case in which a control subject including a combustion apparatus is to be controlled.

Plant control method and apparatus that can attain the second object will be described below in detail with reference to the illustrated embodiment of the present invention.

Figure 14:
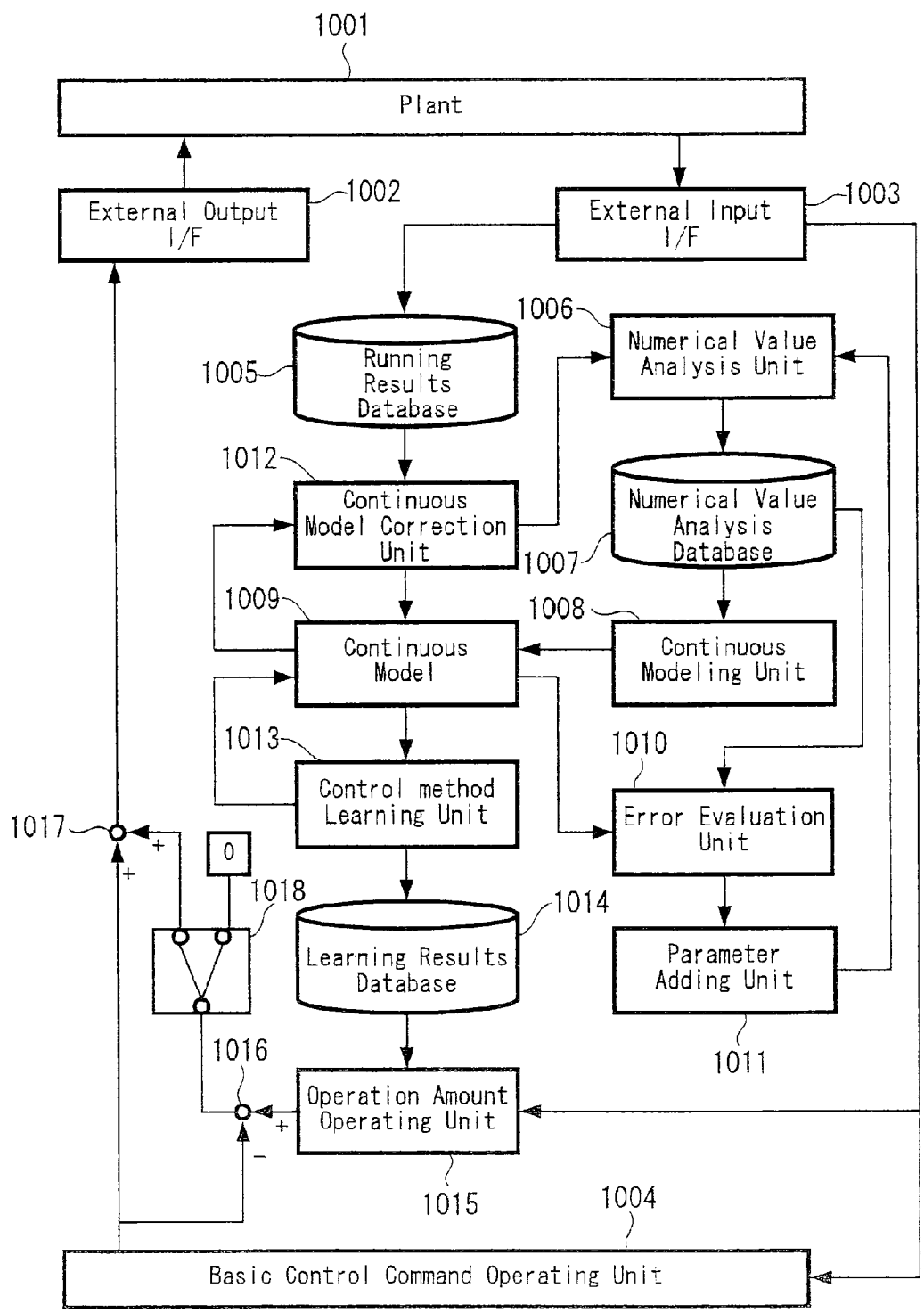
FIG. 14 is a block diagram showing a plant control system according to an embodiment of the present invention.

FIG. 14 shows an embodiment in which the present invention is applied to a boiler facility of a thermal power plant, where a control system learns a control method to operate flow rates of an air supplied to a boiler of a plant 1001 including a boiler facility to minimize concentration of exhausted CO. As shown in FIG. 14, according to this embodiment, the plant 1001 includes an external output interface 1002 and an external input interface 1003.

First, the external output interface 1002 inputs a signal from an adder 1017 and outputs the inputted signal to the plant 1001 to operate the air flow rate. If necessary, the external output interface 1002 may include a keyboard operable by the operator and a display.

Next, the external input interface 1003 inputs a signal outputted from the plant 1001 and outputs the inputted signal to a running results database 1005, a basic control command operating unit 1004 and an operation amount operating unit 1015 as plant running data. Also at that time, the external input interface 1003 may include a keyboard operable by the operator and a display.

Next, the basic control command operating unit 1004 outputs a basic control command signal to operate the air flow rate of the plant 1001 and the like, for example, and it is constructed by a control system composed of a general PID control logic.

Also, plant running data outputted from the external input interface 1003 are stored in the running results database 1005.

Here, the running data represent process values that may prescribe the states of the plant 1001. For example, as shown in FIG. 15, the running data represent data indicating relationships among CO concentration and NOx concentration and the air flow rate. In addition to data indicating NOx and CO discharged from these plants, these running data are at least one kind of an amount or concentration of CO2, Sox, mercury, fluorine, flue gas or fine grain and the like of mist or volatile organic compound.

Next, a numerical value analyzing unit 1006 is a simulator for simulating plant running and employs a simulation method described in the Patent Document 3, for example. The numerical value analyzing unit 1006 carries out simulation based on given conditions such as the shape of the boiler of the plant 1001 and types of coals and the operation conditions such as the flow rate of air to thereby calculate a concentration of CO generated when the plant is running.

The operation conditions required at that time may contain, in addition to the above-described air flow rate, at least one kind of the fuel flow rate, the air temperature, the air distribution within the burner of the boiler, the tilt angle of the burner of the boiler and the parallel damper angle of the boiler.

Then, the analyzed result brought by this numerical value analyzing unit 1006 is given as the value of CO concentration relative to the air flow rate, for example, and stored in the numerical value analysis database 1007. The data stored at that time is of the similar format to that of data stored in the running results database 1005 shown in FIG. 15.

Consecutive model unit 1008 creates consecutive models 1009 by approximating the relationship between discrete air flow rate and CO concentration stored in the numerical value analysis database 1007 to a continuous relationship relative to the change of the parameter. Accordingly, this continuous model 1009 is created by the continuous modeling unit 1008 or consecutive models correcting unit 1017.

Next, an error evaluating means 1010 evaluates an error between data stored in the numerical value analysis database 1007 and the consecutive models 1009 created by the continuous modeling unit 1008. Also, a parameter adding unit 1011 sets a value of an air flow rate on which additional numerical value analysis is to be carried out and adds data point if the error evaluated by the error evaluating unit 1010 satisfies a constant condition. Then, the numerical value analyzing unit 1006 performs numerical value analysis on the added data point.

On the other hand, the consecutive models correcting unit 1012 corrects a model of the consecutive models 1009 by using running data stored in the running results database 1005. Then, a control method learning unit 1013 learns an air flow rate operation method by using the reinforcement learning method based on the continuous model 1009. Learning results are stored in the learning result database 1014. FIG. 16 shows an example of learning results stored in the learning result database 1014 at that time.

Next, an operation amount operating unit 1015 calculates a value of an air flow rate to be operated by using running data outputted from the external input interface 1003 and the learning result database 1014. If the learning result is that shown in FIG. 16, an air flow rate of 0.45 may become an air flow rate of +0.05 under control of a control signal. The calculated control signal is outputted to a subtracter 1016.

Accordingly, the subtracter 1016 is supplied with the output signal of the basic control command operating unit 1004 and the output signal of the operation amount operating unit 1015, calculates a difference between these two kinds of signals and outputs a difference signal to an adder 1017. At that time, a switcher 1018 is provided, and hence the output from the subtracter 1016 is disconnected from the input of the adder 1017 so that the plant can be run by only the output from the basic control command operating unit 1004 similarly to the related art.

The adder 1017 is supplied with the output signal of the basic control command operating unit 1004 and the output of the subtracter 1016 and calculates and outputs a sum of these two kinds of signals. Accordingly, by these subtracter 1016 and adder 1017, the output signal to the plant 1001 can be provided as a signal in which the output signal from the basic control command operating unit 1004 is corrected by the output signal from the operation amount operating unit 1015.

Next, operations of this embodiment will be described with reference to a flowchart shown in FIG. 17.

In order to control CO concentration by operating the air flow rate of the boiler in the embodiment shown in FIG. 14, it is necessary to know the change of CO concentration relative to the change of air flow rate. Accordingly, referring to FIG. 17, first, a relationship between air flow rate and CO concentration is calculated by numerical value analysis at a step 1101. FIG. 18 shows an example of calculated results obtained at that time. Solid circles in FIG. 18 show results obtained when the air flow rate was calculated from 0.3 to 0.7 at an interval of 0.1.

While it is desirable that numerical value analysis at that time should be carried out at an interval as short as possible, a certain length of time may be required to calculate points shown by respective solid circles and hence only discrete data can actually be obtained. Accordingly, at a step 1102, an approximate continuous model is created so as to form a continuous relationship relative to the change of parameters in order to interpolate portions without data points.

The continuous model at that time may be created by a suitable method such as a method based on approximation polynomial and a method using a neural network.

Here, a characteristic shown by a broken line in FIG. 18 shows results obtained when consecutive models is created by approximating the data points. According to this characteristic, it is possible to continuously estimate CO concentration from the air flow rate given as the continuous model.

At the next step 1103, data to be stored in the learning result database 1014 is constructed by the reinforcement learning method.

Since this embodiment operates the plant by using the learning result, control efficiency greatly depends on accuracy of the continuous model for use in learning.

In order to enhance control efficiency, the interval of the air flow rate on which numerical value analysis is performed should be reduced so as to increase the number of data points. However, since it is difficult to carry out numerical value analysis at a large number of data points within the aforementioned practical time length, it is important to suppress the number of data points by effectively selecting data points. For example, in the case of FIG. 18, it is considered that importance of data is high close to the portion in which air flow rate is 0.5 with low CO concentration. Accordingly, data points are added by the following procedure.

Figure 19:
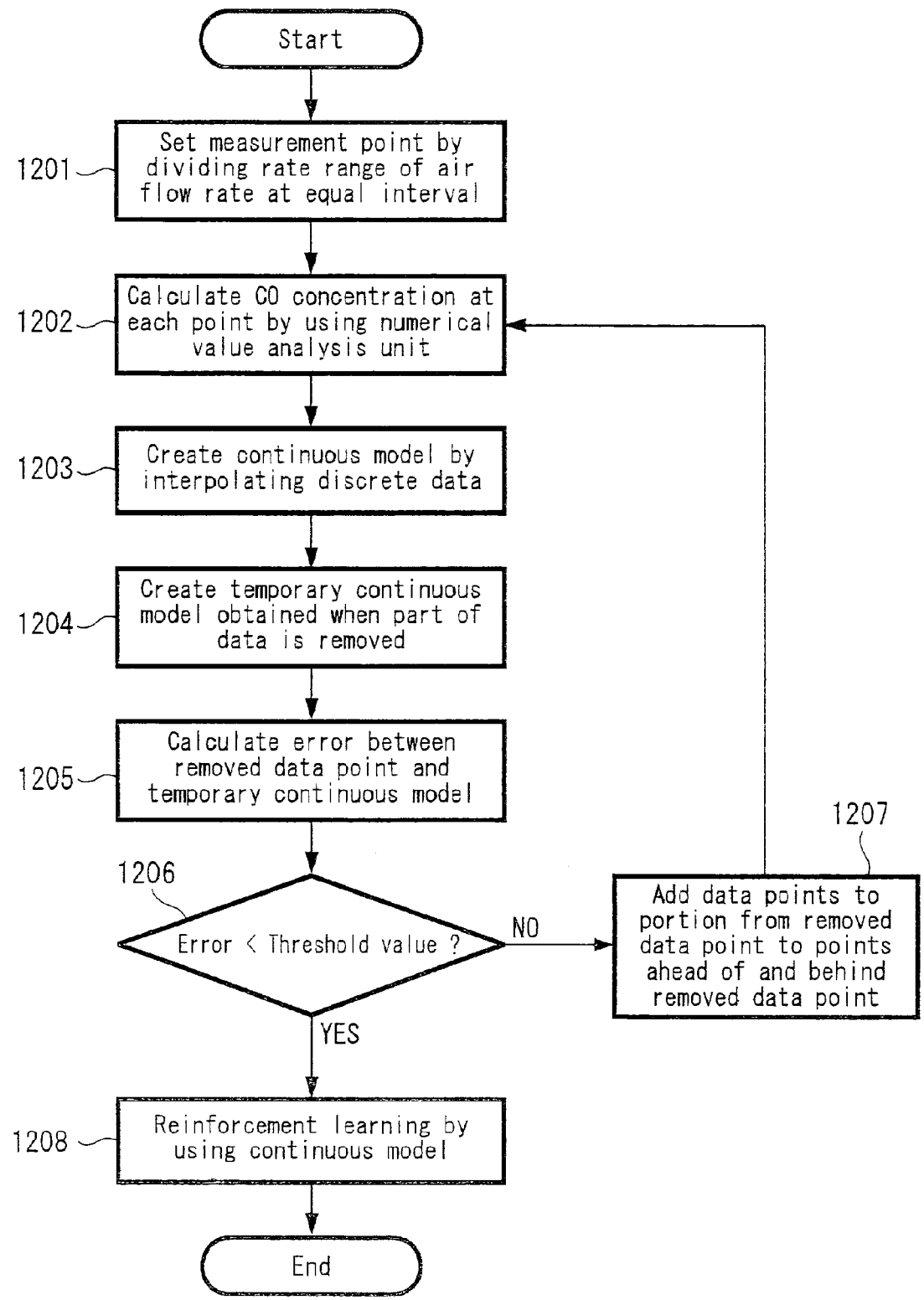
FIG. 19 is a flowchart showing a procedure of adding numerical analysis data in the embodiment according to the present invention.

FIG. 19 shows a detailed flowchart to create consecutive models based on numerical value analysis. Steps 1201 to 1208 in FIG. 19 correspond to the steps 1101 to 1103 in FIG. 17.

Referring to FIG. 19, first, at the step 1201, there are set points of air flow rates that should be calculated by numerical value analysis. Since points to be set herein become initial setting, the interval of points and the number of points may be properly set within a range in which air flow rates may be changed in consideration of accuracy of analysis, a required time and the like.

At the next step 1201, CO concentration at the points of respective air flow rates is calculated by using the numerical value analysis method. Calculated results are stored in the numerical value analysis database.

At the next step 1202, discrete data are interpolated and continuous models are created. After that, at a step 1204, consecutive models obtained when arbitrary data points are removed is temporarily created and an error between the removed data points and the temporary continuous model is calculated at a step 1205.

Figure 20:
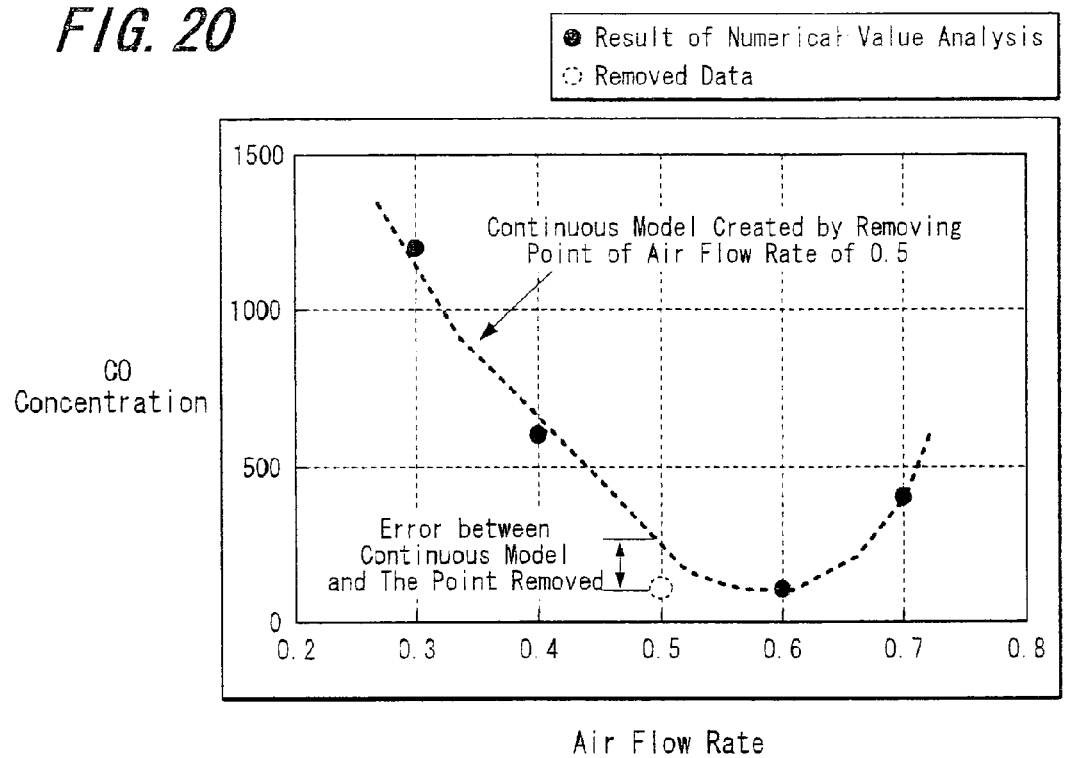
FIG. 20 is a diagram illustrating error evaluation in the embodiment according to the present invention.

FIG. 20 shows an example of calculated results obtained at that time. In this case, since an error between the continuous model created with the data point of the air flow rate of 0.5 being removed and the data point of the air flow rate of 0.5 is increased, it is to be understood that the point close to the air flow rate of 0.5 influences the continuous model greatly and that the air flow rate should be calculated at a short interval.

Accordingly, after the step 1205, this error is compared with a threshold value at a decision step 1206. If this error is greater than the threshold value as represented by a NO at the decision step 1206, it is judged that importance of data close to that point is high and control goes to the next step 1207, at which the number of data is added to the portion ahead of and behind the removed data points to thereby shorten the interval. Then, CO concentration of these added data points is calculated by using the numerical value analysis method and the continuous model is calculated again.

The data points can be effectively added by repeating the steps 1201 to 1207 until the error becomes small.

Figure 21:
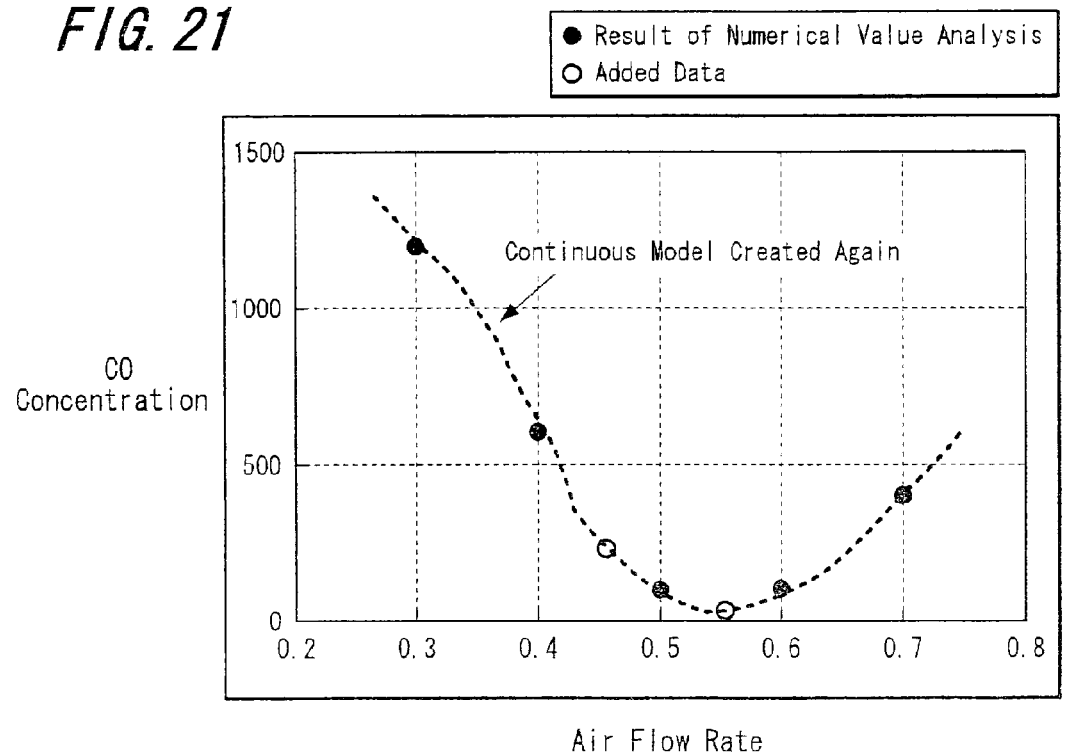
FIG. 21 is a diagram illustrating adding numerical analysis data in the embodiment according to the present invention.

Here, FIG. 21 shows examples of data obtained when the data points are added and the continuous model is created again at the step 1207. FIG. 21 shows that the highly-accurate continuous model can be created by the above-mentioned procedure while the number of data point on which the numerical value analysis is performed being suppressed. Then, control goes to a step 1209 or 1103, at which reinforcement learning is carried out by using the thus made continuous model.

However, since the model obtained by the above-described procedure uses the results of the numerical value calculation, an error may be observed in the actual plant. Therefore, it is desirable to use running data of the actual plant if possible.

Therefore, reinforcement learning is carried out by using the continuous model created in the numerical value analysis at the beginning. If continuous data of the actual plant is obtained later, it is desirable that the model may be corrected by using running data.

Figure 17:
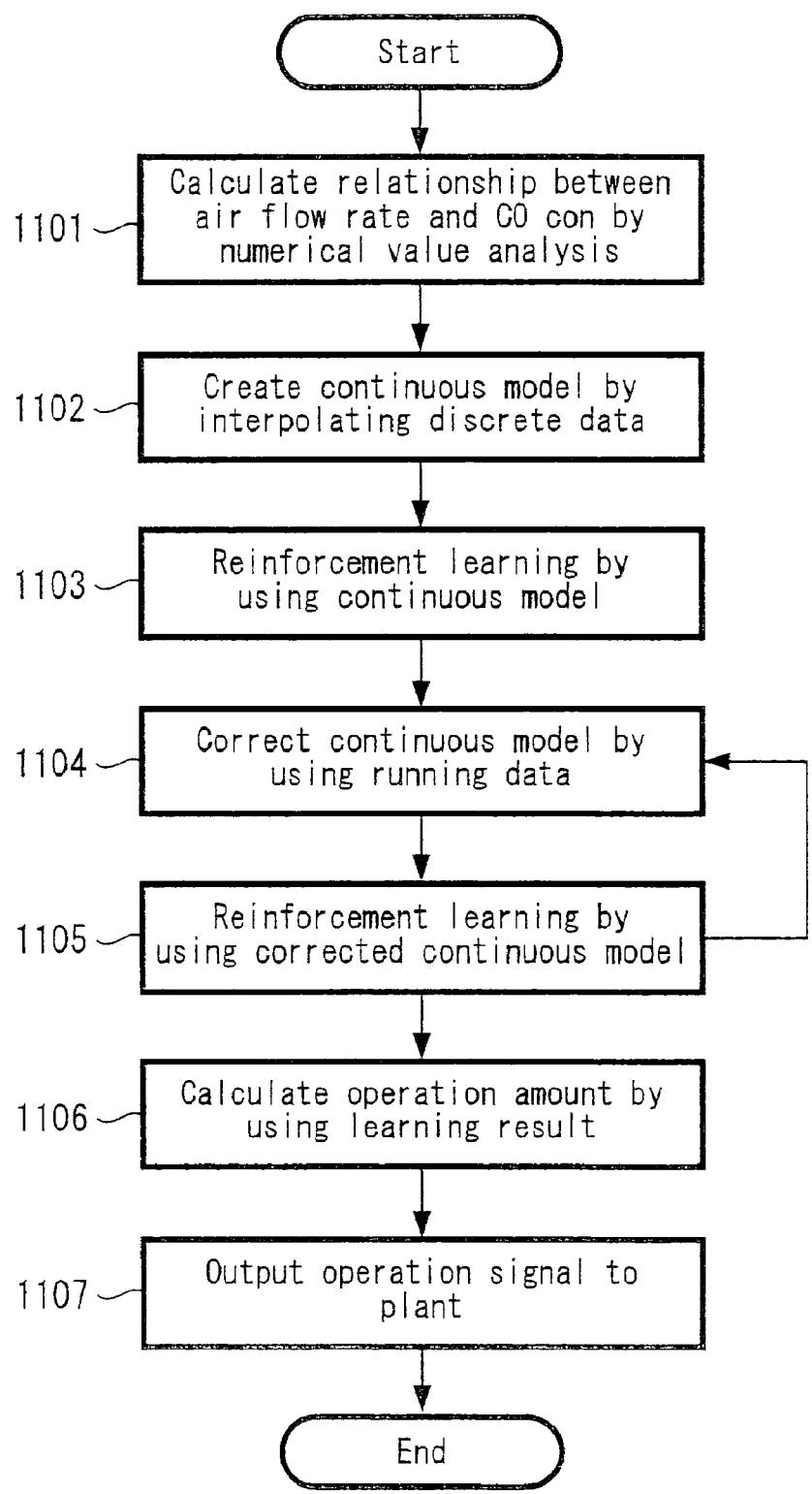
FIG. 17 is a flowchart showing a procedure in the embodiment according to the present invention.
Figure 18:
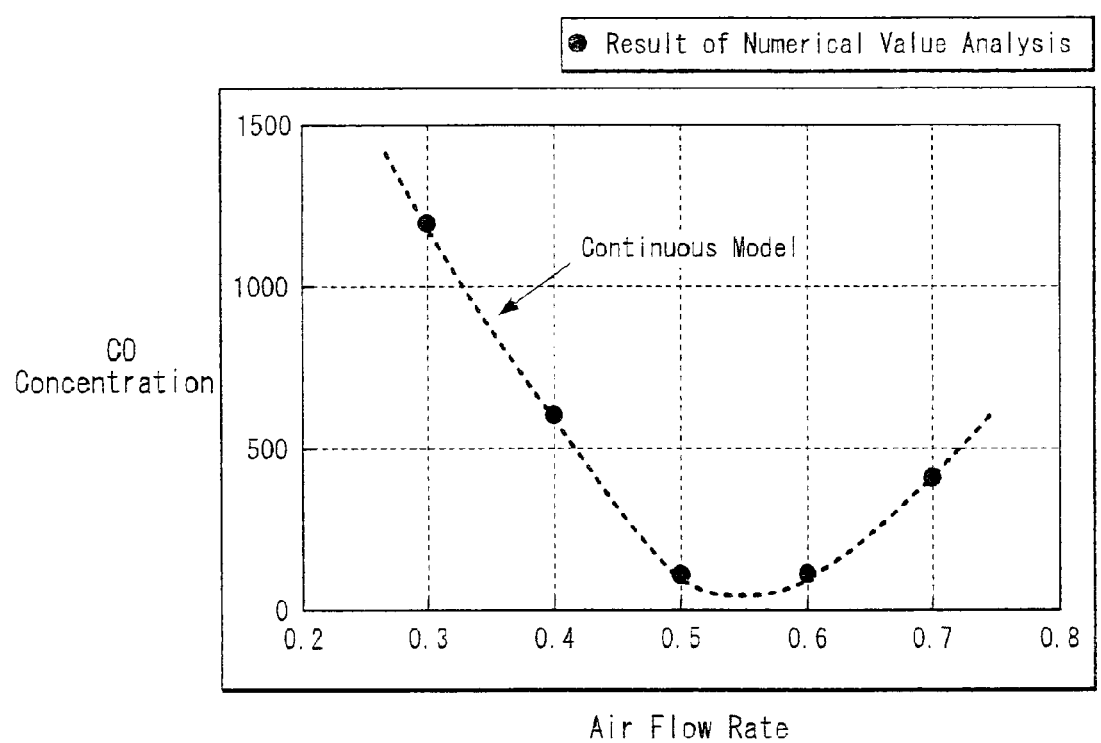
FIG. 18 is a diagram illustrating consecutive models in the embodiment according to the present invention.

Accordingly, in this embodiment, the continuous model is corrected by the following procedure and the control system re-learns the operation method by using this corrected model as the subject and the step 1104 shown in FIG. 17 is provided, at which the continuous model may be corrected by consecutive models correcting unit. For example, running data of the actual plant may be contained in the data that made the continuous model by the numerical value analysis and the continuous model may be created again. Since the running data has a priority, the running data may be given proper weights in advance.

Figure 22:
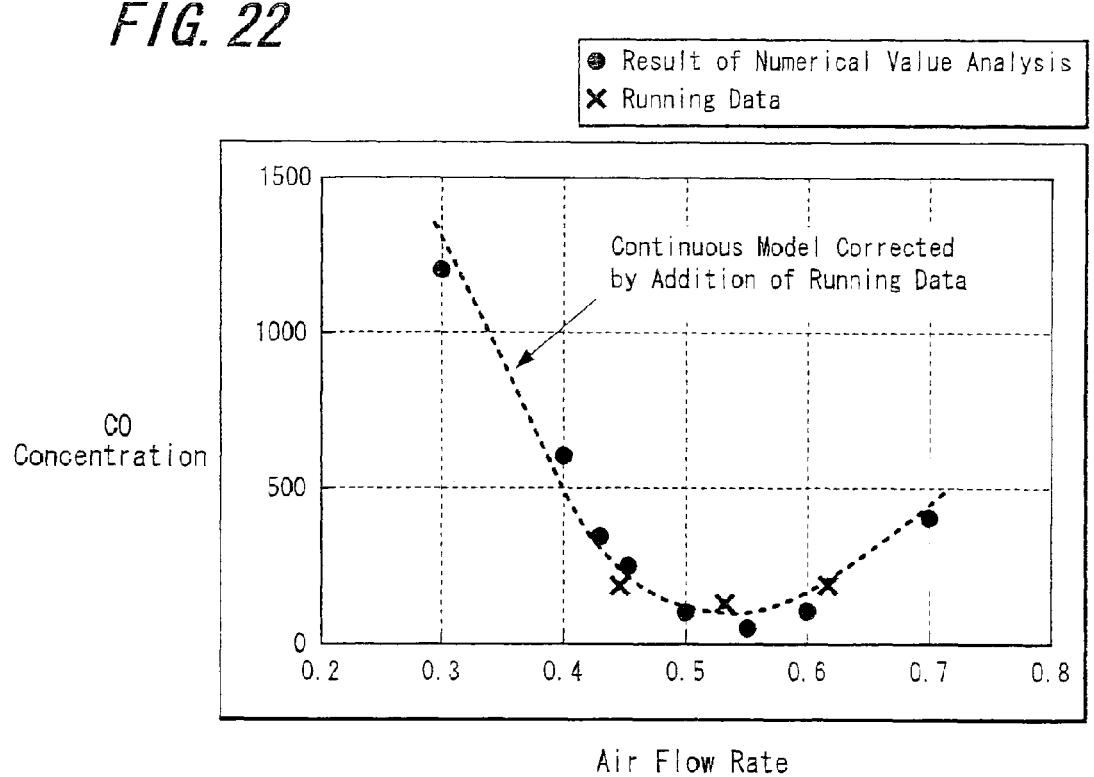
FIG. 22 is a diagram illustrating correction of a continuous model in the embodiment according to the present invention.

FIG. 22 shows an example in which the continuous model is corrected by adding the running data to the data. When this continuous model is compared with the continuous model shown in FIG. 21, it is clear that a tendency of the running data of the actual plant is reflected on this continuous model shown in FIG. 22. For example, consecutive models in which tendency of running data is reflected is provided close to the air flow rate in which the running data is obtained.

Also, the continuous model formed based on the result of the numerical analysis can be created at the portion without running data and hence a model with higher accuracy can be achieved.

Referring back to FIG. 17, at the next step 1105, reinforcement learning is carried out by using the corrected continuous model. In the re-learning, a partial re-learning method is known and according to this method, a control model can be constructed with a small load.

Then, the procedures of these steps 1104 and 1105 are carried out when plant running data is added. Consequently, the continuous model based on the numerical value analysis can be progressively corrected as continuous models with characteristics matched with those of the actual plant. Also, a model for controlling the air flow rate can be progressively corrected as models with characteristics matched with those of the actual plant.

Accordingly, at a step 1106, the operation amount of the air flow rate is calculated by using the result of this reinforcement learning. At the next step 1107, the operation signal is outputted to the plant 1001 and the flow rate of air supplied to the boiler of the plant 1001 is controlled. Since the air flow rate can be controlled based on the result of the numerical value analysis in the trial running of the plant, a time required until the control system is introduced can be reduced and the characteristic of the model can be corrected to be the characteristic of the actual plant as the running data are accumulated. Therefore, the control system with high efficiency to suppress the CO can be obtained.

Accordingly, according to the above-described embodiments of the present invention, the model for use in learning can be constructed by using the result of the numerical value analysis before running of the plant. Accordingly, a time required for introducing the plant control system can be reduced, specification efficiency of the control system can be exhibited from the stage in which plant running results are not yet accumulated sufficiently and a planned suppressing effect of CO can be obtained. That is, the plant control system according to the present invention can prevent fuel and raw material from being consumed much in the trial running period and can also prevent materials discharged from the plant from influencing the environment.

According to the above-described embodiments of the present invention, a model error can be decreased and control with high efficiency can be carried out by creating the operation condition parameter based on the error evaluation of the numerical value analysis and by addition of the numerical value analysis data. At that time, the model is corrected by using the plant running data and reinforcement learning is carried out, thereby making it possible to carry out control with high efficiency constantly.

Accordingly, with application of the present invention according to the above-described embodiments to the boiler of the thermal power plant, it is possible to decrease a risk in which the environment load materials such as NOx and CO will be increased.

Since the present invention can control the plant by using the result of the numerical value analysis from the time of the trial running of the plant, the period required until the control system is introduced can be reduced. Also, the operation condition parameter is created by the error evaluation of the result of the numerical value analysis and the numerical value analysis data is added, and hence a model error can be reduced. In addition, the model is corrected by using the plant running data and the reinforcement learning is carried out again, and hence control with high efficiency can be carried out constantly.

When the present invention is applied to the boiler of the plant, it is possible to decrease a risk in which the environment load materials such as NOx and CO will be increased.

Having described preferred embodiments of the invention with reference to the accompanying drawings, the invention is not limited to those precise embodiments and various changes and modifications could be effected therein by one skilled in the art without departing from the spirit or scope of the invention as defined in the appended claims.

What is claimed is:

1. A control system for a control subject having a combustion apparatus, comprising:
   a basic control command operating unit configured to input measurement data of the control subject having a combustion apparatus to operate an operation command value to the control subject;
   a fuel data storage unit configured to store data sets of operation parameters of the combustion apparatus and components in combustion gas for a plurality of fuel compositions to be supplied to the combustion apparatus;
   a running results database for storing past running results values of the control subject;
   a data creating unit configured to calculate distances between data of the past running results values of the control subject and the data sets and determine a data set in which a distance between data is minimum;
   a modeling unit configured to model a relationship between operation parameters of the combustion apparatus and components in combustion gas of the combustion apparatus by using the data set determined by the data creating unit; and a correcting unit configured to calculate combustion apparatus operation parameters with which components in a better condition than the components in current combustion gas are provided by using a model of the modeling unit and to correct operation command values of the basic control command operating unit with the calculated operation parameters, wherein a data flag is provided in a new data set created by the data creating unit in order to distinguish numeral value analysis data and running results data of the new data set, and wherein the modeling unit is configured to regard running results data as important data when creating a model by distinguishing the data flag.

2. A control system for a control subject having a combustion apparatus, comprising:

a basic control command operating unit configured to input measurement data of the control subject having a combustion apparatus to operate an operation command value to the control subject;

a fuel data storage unit configured to store data sets of operation parameters of the combustion apparatus and components in combustion gas for a plurality of fuel compositions to be supplied to the combustion apparatus;

a running results database for storing past running results values of the control subject;

a data creating unit configured to calculate distances between data of the past running results values of the control subject and the data sets and determine a data set in which a distance between data is minimum;

a modeling unit configured to model a relationship between operation parameters of the combustion apparatus and components in combustion gas of the combustion apparatus by using the data set determined by the data creating unit; and a correcting unit configured to calculate combustion apparatus operation parameters with which components in a better condition than the components in current combustion gas are provided by using a model of the modeling unit and to correct operation command values of the basic control command operating unit with the calculated operation parameters, wherein the correcting unit includes a switcher that is configured, when outputting a correction operation command value for correcting the operation command values to the basic control command operating unit, if an output value of the modeling unit is abnormal, to switch a coefficient that is multiplied with a calculated correction operation command value from one to zero.

3. A control system for a control subject having a combustion apparatus, comprising:

a basic control command operating unit configured to input measurement data of the control subject having a combustion apparatus to operate an operation command value to the control subject;

a fuel data storage unit configured to store data sets of operation parameters of the combustion apparatus and components in combustion gas for a plurality of fuel compositions to be supplied to the combustion apparatus;

a running results database for storing past running results values of the control subject;

a data creating unit configured to calculate distances between data of the past running results values of the control subject and the data sets and determine a data set in which a distance between data is minimum;

a modeling unit configured to model a relationship between operation parameters of the combustion apparatus and components in combustion gas of the combustion apparatus by using the data set determined by the data creating unit; and a correcting unit configured to calculate combustion apparatus operation parameters with which components in a better condition than the components in current combustion gas are provided by using a model of the modeling unit and to correct operation command values of the basic control command operating unit with the calculated operation parameters, wherein a time-series graph showing deviations between calculated values of components in combustion gas calculated by the modeling unit and the running results data and movement mean values thereof is displayed in a display, and when any of the deviations, movement mean values and rates of changes of the movement mean values exceeds respective preset allowable values, a warning message indicating exceeding an allowable value is displayed.

* * * * *